US008688383B2

(12) United States Patent
Hughes et al.

(10) Patent No.: US 8,688,383 B2
(45) Date of Patent: Apr. 1, 2014

(54) FORECASTING ASPHALTIC PRECIPITATION

(75) Inventors: Trevor Hughes, Cambridge (GB); Gary Tustin, Sawston (GB); Alexander Wilson, Hardwick (GB); Carlos Abad, Richmond, TX (US); Shiyi Wang, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 460 days.

(21) Appl. No.: 12/988,869

(22) PCT Filed: Apr. 23, 2009

(86) PCT No.: PCT/GB2009/001060
§ 371 (c)(1),
(2), (4) Date: Feb. 11, 2011

(87) PCT Pub. No.: WO2009/130483
PCT Pub. Date: Oct. 29, 2009

(65) Prior Publication Data
US 2011/0172924 A1    Jul. 14, 2011

(30) Foreign Application Priority Data
Apr. 23, 2008  (GB) .................................. 0807387.6

(51) Int. Cl.
*G06F 19/00* (2011.01)
(52) U.S. Cl.
USPC ............................................................ 702/11
(58) Field of Classification Search
USPC ............................................................ 702/11
See application file for complete search history.

(56) References Cited

U.S. PATENT DOCUMENTS

| 3,358,757 | A | 12/1967 | Holmes |
| 3,954,141 | A | 5/1976 | Allen et al. |
| 4,004,636 | A | 1/1977 | Brown et al. |
| 4,007,785 | A | 2/1977 | Allen et al. |
| 4,008,764 | A | 2/1977 | Allen |
| 4,026,358 | A | 5/1977 | Allen |

(Continued)

FOREIGN PATENT DOCUMENTS

| WO | 0120322 A1 | 3/2001 |
| WO | 0155281 A1 | 8/2001 |
| WO | 2006047745 A1 | 5/2006 |
| WO | 2007005944 A2 | 1/2007 |

OTHER PUBLICATIONS

John F. Schabron, Petroleum Residua Solubility Parameter / Polarity Map: Stability Studies of Residua Pyrolysis, Apr. 1999, WRI-99-R004, 30 pages.*

(Continued)

*Primary Examiner* — Tung S Lau

(57) ABSTRACT

The magnitude of asphaltic precipitation when injecting a viscosity reducing diluent into a reservoir formation, notably to assist oil recovery therefrom, is forecast by (i) determining a relationship between asphaltic precipitation and a solubility parameter for the diluted oil, and then (ii) utilizing that relationship to forecast the magnitude of asphaltic precipitation when injecting a predetermined viscosity reducing diluent into the formation. Making this forecast may be followed by injecting a viscosity reducing diluent into the formation to assist oil recovery. The diluent may in particular be supercritical carbon dioxide or other asphaltene precipitant mixed with a more polar material in proportions designed by forecasting asphaltic precipitation by candidate materials in possible proportions.

13 Claims, 5 Drawing Sheets

(56) References Cited

U.S. PATENT DOCUMENTS

| | | | |
|---|---|---|---|
| 4,071,458 A | 1/1978 | Allen |
| 4,101,425 A | 7/1978 | Young et al. |
| 4,109,720 A | 8/1978 | Allen et al. |
| 4,271,905 A | 6/1981 | Redford et al. |
| 4,337,828 A | 7/1982 | Blair, Jr. |
| 4,379,489 A | 4/1983 | Rollmann |
| 4,487,264 A | 12/1984 | Hyne et al. |
| 4,498,537 A | 2/1985 | Cook |
| 4,565,249 A | 1/1986 | Pebdani et al. |
| 4,609,043 A | 9/1986 | Cullick |
| 4,614,236 A | 9/1986 | Watkins et al. |
| 4,628,999 A | 12/1986 | Kiss et al. |
| 4,687,058 A | 8/1987 | Casad et al. |
| 4,706,750 A | 11/1987 | Buckles |
| 4,756,369 A | 7/1988 | Jennings, Jr. et al. |
| 4,800,957 A | 1/1989 | Stevens, Jr. et al. |
| 4,821,801 A | 4/1989 | Van Laar |
| 4,852,651 A | 8/1989 | Davis |
| 4,887,671 A | 12/1989 | Stevens, Jr. |
| 4,913,235 A | 4/1990 | Harris et al. |
| 4,945,989 A | 8/1990 | Irani et al. |
| 4,945,990 A | 8/1990 | Irani et al. |
| 4,989,674 A | 2/1991 | Davis |
| 5,022,467 A | 6/1991 | Irani et al. |
| 5,056,596 A | 10/1991 | McKay et al. |
| 5,080,169 A | 1/1992 | Davis |
| 5,117,907 A | 6/1992 | Hsu |
| 5,123,486 A | 6/1992 | Davis |
| 5,139,088 A | 8/1992 | De Boer et al. |
| 5,232,049 A | 8/1993 | Christiansen et al. |
| 5,388,644 A | 2/1995 | Romocki |
| 5,400,430 A | 3/1995 | Nenniger |
| 5,438,039 A | 8/1995 | Del Bianco et al. |
| 5,690,176 A | 11/1997 | Delbianco et al. |
| 5,711,373 A | 1/1998 | Lange |
| 5,871,053 A | 2/1999 | Stern |
| 6,051,535 A | 4/2000 | Bilden et al. |
| 6,467,340 B1 | 10/2002 | Gallagher et al. |
| 6,534,449 B1 | 3/2003 | Gilmour et al. |
| 6,564,869 B2 | 5/2003 | McKenzie et al. |
| 6,630,428 B1 | 10/2003 | Furman et al. |
| 6,662,872 B2 | 12/2003 | Gutek et al. |
| 7,198,103 B2 | 4/2007 | Campbell |
| 7,231,976 B2 | 6/2007 | Berry et al. |
| 7,500,522 B2 | 3/2009 | Skibinski et al. |
| 2003/0024703 A1 | 2/2003 | McKenzie et al. |
| 2003/0167157 A1 | 9/2003 | Mougin et al. |
| 2003/0213747 A1 | 11/2003 | Carbonell et al. |
| 2005/0211434 A1 | 9/2005 | Gates et al. |
| 2006/0035793 A1 | 2/2006 | Goldman |
| 2006/0096757 A1 | 5/2006 | Berry et al. |
| 2006/0136175 A1 | 6/2006 | Suzuki et al. |
| 2007/0007004 A1 | 1/2007 | Castellano |
| 2007/0062698 A1 | 3/2007 | Smith et al. |
| 2007/0095534 A1 | 5/2007 | Hughes |
| 2007/0095753 A1 | 5/2007 | Carbonell |
| 2007/0124950 A1 | 6/2007 | Wirtz |
| 2007/0151729 A1 | 7/2007 | Hoch |
| 2007/0169934 A1 | 7/2007 | Campbell |
| 2007/0295640 A1 | 12/2007 | Tan et al. |
| 2008/0139418 A1 | 6/2008 | Cioletti |

OTHER PUBLICATIONS

J.S. Buckley, Asphaltene precipitation and solvent properties of cruel oils, Petroleum science and technology 1998 16, No. 3-4, 251-285, p. 1-28.*
Zhong et al: "Solubility of stearic acid in supercritical CO2 with cosolvents", 1997. J. Supercritical Fluids, v10, 113-118.
Thomas et al: "Limonene"; Natural product reports 1989, pp. 291-309.
Vargas et al: "Development of a general method for Modeling Asphaltene Stability"; Energy and Fuels 23 pp. 1147-1154 (2009).
Search Report for PCT/GB2009/001060 dated Sep. 14, 2009.
Search Report for GB0807387.6 dated Jun. 2, 2008.
Rassamdana et al "Asphalt Flocculation and Deposition: 1. the Onset of precipitation"AIChE Journal vol. 42 pp. 10-22 Jan. 1996.
Akbardazeh et al: "Methodology for the Characterization and Modeling of Asphaltene Precipitation from Heavy Oils Diluted with n-Alkanes"; Energy & Fuels 18, 1434-1441 (2004).
Alboudwarej et al: "Regular Solution Model for Asphaltene Precipitation from Bitumens and Solvents"; AIChE Journal 49, 2948-2956 (2003).
Allada, S R: "Solubility Parameters of Supercritical Fluids"; Ind_Eng_Chem_Process Des_Dev_23_344-348 (1984).
Anderson, S I: "Flocculation Onset Titration of Petroleum Asphaltenes"; Energy & Fuels 13, 315-322 (1999).
Angle et al: "Precipitation of asphaltenes from solvent-diluted heavy oil and thermodynamic properties of solvent-diluted heavy oil solutions"; Fuel vol. 85 pp. 492-506 (2006).
Benvenuti et al: "High pressure equilibrium data in systems containing supercritical carbon dioxide, limonene and citral"; J. Chem. Eng. Data, vol. 46, pp. 795-799 (2001).
Berna et al: "Solubilities of Essential Oil Components of Orange in Supercritical Carbon Dioxide"; J. Chem. Eng. Data, 45 (5), 724-727 (2000).
Bon et al: "A Technical Evaluation of a CO2 Flood for EOR Benefits in the Cooper Basin, South Australia"; SPE Paper 88451 (2004).
Broad et al: "Deposition of Asphaltenes during CO2 Injection and Implications for EOS Description and Reservoir Performance"; IPTC paper 11563 (2007).
Buckley et al: "Solubility of the Least-Soluble Asphaltenes" Chapter 10 of "Asphaltenes, Heavy oils and Petroleomics" edited by Oliver C Mullins, Eric Y. Sheu, Ahmed Hammami and Alan G Marshall, Springer Science&business media LLC, 2007 pp. 401-437.
Buckley et al: "Asphaltene Precipitation and Solvent Properties of Crude Oils"; Petroleum Science and Technology vol. 16, No. 3-4, pp. 251-285 (1998).
Butler et al: "A new process (VAPEX) for recovering heavy oils using hot water and hydrocarbon vapour", JCPT, v30, No. 1, 97-106 Jan.-Feb. 1991; Petsoc paper 91-01-09-P.
Butler et al: "Recovery of heavy oils using vapourised hydrocarbon solvents: further developments of the VAPEX process", JCPT, v32, No. 6, pp. 56-62, Jun. 1993; Petsoc paper 93-06-06-P.
Consan et al: "Observations on the solubility of surfactants and related molecules in carbon dioxide at 50° C.", J. Supercritical Fluids, v3, 51-65 (1990).
Dandge et al: "Structure Solubility Correlations: Organic Compounds and Dense Carbon Dioxide Binary Systems"; Ind. Eng, Chem. Prod. Res. Dev. vol. 24, pp. 162-166 (1985).
Das et al: "Effect of asphaltene deposition on the VAPEX process: A preliminary investigation using a Hele-Shaw cell", JCPT, v33, No. 6, pp. 39-45, Jun. 1994; Petsoc paper 94-06-06-P.
Fan et al: "Evaluating Crude Oils by SARA Analysis" SPE Paper 75228 (2002).
Fisher, C H: "Solubility Parameters of Oil and Fat Chemicals"; J. American Oil Chemists Society vol. 78(2)_p. 215_(2001).
Frost et al: "New, Highly Effective Asphaltene Removal System With Favorable HSE Characteristics"; SPE paper 11420 (2008).
Gonzalez et al: "Asphaltenes Precipitation from Crude Oil and Hydrocarbon Media"; Energy & Fuels vol. 20 pp. 2544-2551 (2006).
Guo et al: "Offshore Pipelines" Gulf Professional Publishing 2005, pp. 188-194.
Hirschberg et al: "Influence of Temperature and Pressure on Ashpaltene Flocculation"; Society of Petroleum Engineers Journal, Jun. 1984 pp. 283-293; SPE paper 11202.
Hirschberg, A: "Role of Asphaltenes in Compositional Grading of a Reservoir's Fluid Column"; Journal of Petroleum Technology, Jan. 1988 pp. 89-94, SPE 13171.
Hong et al: "Precipitation and fouling in heavy oil-diluent blends" Heat transfer engineering yr:2009 vol. 30 iss:10-11 p. 786-793.
Hwang et al: "Mitigation of asphaltics deposition during CO2 flood by enhancing CO2 solvency with chemical modifiers"; Organic Geochemistry 31 (2000) pp. 1451-1462.
Ibrahim et al: "Correlations of Characteristics of Saskatchewan Crude Oils/Asphaltenes with Their Asphaltenes Precipitation Behav-

(56) References Cited

OTHER PUBLICATIONS ior and Inhibition Mechanisms: Differences between CO2 and n-Heptane-Induced Asphaltene Precipitation"; Energy & Fuels 2004, 18, 1354-1369.
"Jiang et al: ""Study of asphalt/asphaltene precipitation during addition of solvents to West Sak crude""; Preprints—American Chemical Society. Division of Petroleum Chemistry yr:1990 vol. 35 iss:3 p. 522-530".
Mansoori G A: "Modeling and Prevention of Asphaltene and Other Heavy Organic Deposition in Oil Wells"; SPE Paper 27070 (1994).
Medina Gonzalez et al: "Fatty Acid Methyl Esters as Biosolvents of Epoxy Resins: A Physicochemical Study"; J Solution Chem vol. 36 pp. 437-446 (2007).
Mitchell et al: "The solubility of asphaltenes in hydrocarbon solvents"; Fuel, 1973, vol. 52, Apr. 149-152.
Mofidi et al: "A simplified thermodynamic modeling procedure for predicting asphaltene precipitation"; Fuel vol. 85 pp. 2616-2621 (2006).
Mutelet et al: "Solubility Parameters of Crude Oils and Asphaltenes"; Energy & Fuels 2004, 18, 667-673.
Nikookar et al: "Modification of a thermodynamic model and an equation of state for accurate calculation of asphaltene precipitation phase behavior"; Fuel 87 pp. 85-91 (2008).
Nilsson et al, "Solubilities of methyl oleate, oleic acid, oleyl glycerols and oleyl glycerol mixtures in supercritical carbon dioxide", 1991. J. Am. Oil. Chemists Soc., v68, No. 2, 87-91.
Raje et al: "Gel Systems for Controlling CO2 Mobility in Carbon Dioxide Miscible Flooding"; SPE paper 55965 (1999).
Redelius, P: "Bitumen Solubility Model Using Hansen Solubility Parameter"; Energy & Fuels 2004, 18. 1087-1092.
Redford, D.A., "The use of solvents and gases with steam in the recovery of bitumen from oil sands", JCPT, Jan.-Feb. 1982; Petsoc paper 82-01-03-P.
Shedid et al: "Laboratory Investigation of Influences of Initial Oil Saturation and Oil Viscosity on Oil Recovery by CO2 Miscible Flooding" SPE Paper 106958 (2007).
Speight, J Q: "The Chemistry and Technology of Petroleum" Third Edition, Revised and expanded, published Marcel Dekker 1999 pp. 412-419 and 452 & 453.
Takhar et al: "Prediction of Asphaltene Deposition During Production—Model description and Experimental Details"; SPE paper 30108 (1995).
Upreti et al: "Vapor Extraction of Heavy Oil and Bitumen: A Review"; Energy & Fuels 2007, 21, 1562-1574.
Verdier et al: "Experimental Determination of Solubility Parameters of Oils as a Function of Pressure"; Energy&Fuels vol. 19 pp. 1225-1229 (2005).
Verdier et al: "Study of Asphaltene Precipitation by Calorimetry"; Energy & Fuels 2007, 21. 3583-3587.
Verdier et al: "Study of Pressure and Temperature Effects on Asphaltene Stability in Presence of CO2"; Energy & Fuels 2006, 20, 1584-1590.
Wang, J et al: "Asphaltene Stability in Crude Oil and Aromatic Solvents—The Influence of Oil Composition"; Energy & Fuels 2003, 17, 1445-1451.
Wang, J X et al: "An Experimental Approach to Prediction of Asphaltene Flocculation"; SPE paper 64994 (2001).
Wiehe et al: "The Oil Compatibility Model and Crude Oil Incompatibility"; Energy & Fuels 2000, 14, pp. 56-59.
Yang et al: "Investigation of Subfractions of Athabasca Asphaltenes and Their Role in Emulsion Stability"; Energy & Fuels 2004, 18, 770-777.

\* cited by examiner

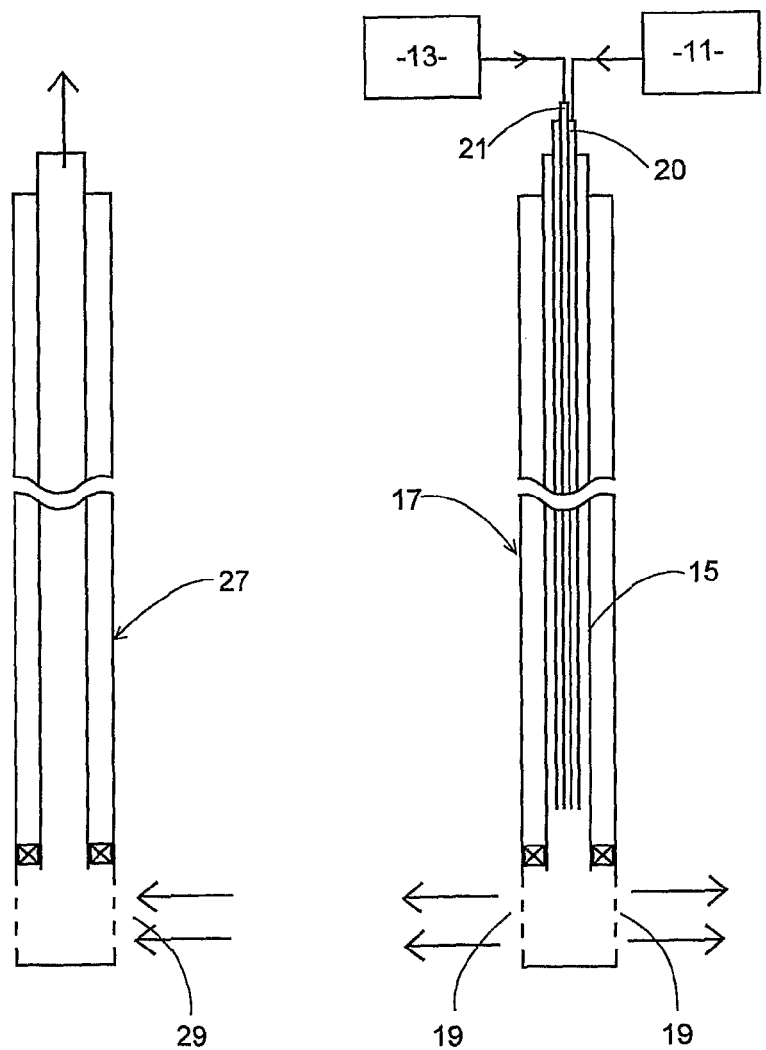
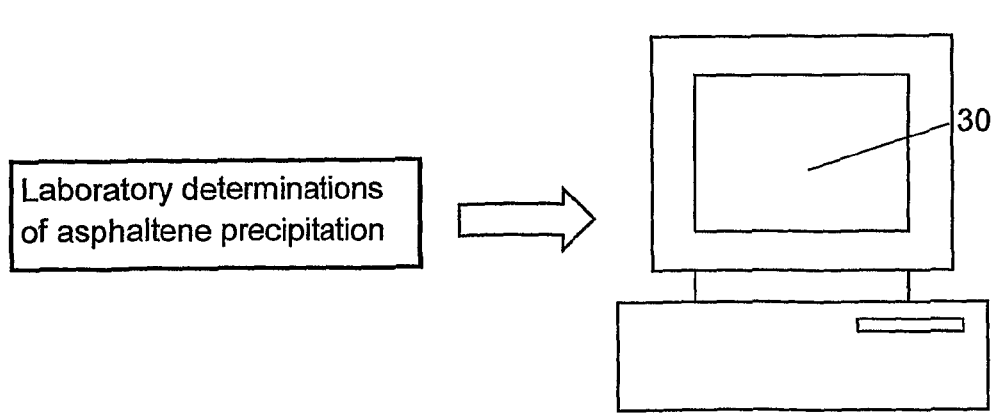
Fig 6
Fig 7

FORECASTING ASPHALTIC PRECIPITATION

FIELD AND BACKGROUND OF THE INVENTION

The present invention relates to oil recovery techniques in which the recovery of oil from a reservoir is assisted by injecting a diluent into the reservoir formation to reduce the viscosity of the crude oil therein. Such techniques have been applied to the recovery of various oils, including the recovery of heavy oils and the enhanced recovery of medium and light oils. The diluent is intended to mix with the crude oil and form a mixture which has lower viscosity than that of the undiluted oil. One diluent which has frequently been proposed or used for this purpose is supercritical carbon dioxide. Another is low molecular weight liquid hydrocarbon which may be a distillation fraction such as naphtha. Mixtures of short chain alkanes, such as methane and ethane or propane and butane have also been used for this purpose, notably in the vapour extraction (VAPEX) process A factor which has sometimes been overlooked, but which can be relevant and even be a potential obstacle to such techniques is the possibility of asphaltene precipitation within the reservoir formation. Asphaltenes occur in varying, and sometimes quite substantial amounts in crude oils. They are a group of organic materials in which the molecules contain fused aromatic ring systems and include nitrogen, sulphur and/or oxygen heteroatoms. They are accordingly more polar than the other fractions of crude oil (saturates, aromatics and resins). They are believed, by some researchers, to occur as colloidal suspensions in crude oil and are prone to separate out if the oil is subjected to a reduction in temperature or pressure, as frequently happens during production from an oil well. Asphaltenes separate out if crude oil is mixed with a less polar diluent (notably a low-boiling n-alkane) and they are generally defined as the fraction of crude oil which is precipitated by addition of n-pentane or n-heptane but which is soluble in toluene.

The separation of asphaltene from crude oil has been variously referred to as flocculation, precipitation or deposition. A modern view is that nano-aggregates of asphaltene molecules flocculate to form a precipitate and this may deposit on adjacent surfaces. It is a well recognised issue that asphaltene may separate from crude oil and accumulate as an undesirable deposit within production, storage and transportation equipment. Remedial treatment of wellbores and near-wellbore regions with solvent and/or heat to remove deposited asphaltene is a regular commercial operation.

The flocculation and precipitation of asphaltene has been recognized to be a complex phenomenon. Buckley et al in "Solubility of the Least-Soluble Asphaltenes" which is chapter 16 of "Asphaltenes, Heavy Oils and Petroleomics" edited by O C Mullins et al (2007) see page 404 have reviewed work which understands asphaltenes to exist as a colloidal suspension in crude oil, with resins playing a role (which has not yet been fully explained) in maintaining the stability of such a suspension. On this understanding of asphaltene suspension, it appears that an interaction between the resin and added diluent can induce flocculation and precipitation. J G Speight in "The Chemistry and Technology of Petroleum" $3^{rd}$ ed (1999) pages 415 and 417 gave a list of nine physical and chemical parameters relevant to asphaltene separation.

The exact nature of this phenomenon of asphaltene precipitation is not yet completely understood and so it is not clear what theoretical model should be applied to it, nor even whether any theoretical model can be justified. However, a number of documents have discussed the characterisation of crude oils to predict the likelihood of asphaltene precipitation. Takhar et al in "Prediction of Asphaltene Deposition During Production—Model Description and Experimental Details," Society of Petroleum Engineers paper 30108, 311-316, May 1995, referred to titration experiments, which make controlled additions of an n-alkane until the onset of precipitation, as a way to check a crude oil's "spare solvency" for asphaltene. Gonzalez et al in "Asphaltenes from Crude Oil and Hydrocarbon Media" Energy and Fuels, vol 20, pages 2544-2551 (2006) reported the use of a fairly similar procedure with several crude oil samples, and confirmed the existing understanding that the stability of asphaltene within a crude oil varies considerably from one oil to another (an oil is termed 'unstable' if precipitation can be induced by small changes in pressure or temperature or by the addition of a small amount of diluent).

Many literature references discuss models for asphaltene precipitation. Among them, there have been a number of suggestions that the "onset" conditions under which precipitation of asphaltene commences as the n-alkane concentration increases can be described in terms of Hildebrand solubility parameter (even though the theoretical basis for that parameter is in real solutions not colloidal suspensions). Mitchell and Speight, in "The Solubility of Asphaltenes in hydrocarbon solvents" Fuel vol 52, pages 149-152 (1973) reported an inverse correlation between asphaltene precipitation from Athabasca bitumen and the Hildebrand solubility parameter of added hydrocarbon which caused precipitation. There was no precipitation when the Hildebrand solubility parameter of the added hydrocarbon was 16.8 or above. Buckley et al in "Solubility of the Least-Soluble Asphaltenes" referenced above, see pages 409-412, commented that a number of authors had concluded that the onset of asphaltene precipitation occurs when the mixture of added diluent and oil is such that its overall Hildebrand solubility parameter is at a critical value. However, Buckley et al went on to demonstrate that this was not a reliable conclusion from the data. They reviewed data of their own to show that the solubility parameter at the onset of precipitation "varies significantly with dilution".

K A Frost et al, in "New, Highly Effective Asphaltene Removal system with Favorable HSE Characteristics" Society of Petroleum Engineers paper 112420, February 2008, described the use of both Hildebrand solubility parameter and the more detailed system of Hansen solubility parameters to characterise solvents to include in emulsions for removing asphaltene as a wellbore remedial treatment.

It has been recognised that asphaltene can precipitate within a formation if a viscosity reducing diluent is injected into the formation and that this can cause significant formation damage. Hwang and Ortiz in "Mitigation of asphaltics deposition during $CO_2$ flood by enhancing $CO_2$ solvency with chemical modifiers" Organic Geochemistry vol 31, pages 1451-1462 (2000), investigated the effect of adding various solvents to supercritical carbon dioxide used to enhance oil recovery. The amount of added solvent was arbitrarily set at 10% of the carbon dioxide and solvent mixture. They demonstrated that addition of various solvents and solvent mixtures to the carbon dioxide achieved a much greater extraction of oil with a reduced amount of carbon dioxide and also reduced the amount of asphaltene remaining in the geological formulation compared with using carbon dioxide alone. The solvents which were tried were toluene, a light aromatic hydrocarbon mixture, alcohols, and mixtures of alcohol and toluene.

US2007/295640 proposes treating a formation with a composition containing a viscosity reducing diluent (which was a substance that would be an asphaltene precipitant if used alone) together with an asphaltene solvent. Possible precipitating diluents include light hydrocarbons as well as carbon dioxide. The compounds suggested in this document as asphaltene solvents are aromatic and substituted aromatic compounds. This document makes a suggestion that the diluent, the asphaltene solvent and any other additives may be related to each other (but only to each other) by solubility parameters.

Some other documents can be identified, in retrospect, as utilising mixtures in which an asphaltene solvent was present. U.S. Pat. No. 4,004,636 taught a process of treating a tar sand formation with a multiple solvent system containing both a first component which is the liquefied form of a normally gaseous material such as carbon dioxide or a short chain hydrocarbon and a second component which is a normally liquid hydrocarbon. Suggested normally liquid hydrocarbons included some such as hexane which are asphaltene precipitants and some such as toluene which are asphaltene solvents. The former category, eg hexane, was preferred on economic grounds and it was reported, expressing some surprise, that these did not cause asphaltene precipitation. The intention was that the first component of the mixture would revert to its gaseous state within the reservoir formation and drive oil from the reservoir towards a production well, while the normally liquid hydrocarbon acted as solvent. Similar disclosure is found in U.S. Pat. No. 3,954,141 and U.S. Pat. No. 4,007,785, while U.S. Pat. No. 4,071,458 and U.S. Pat. No. 4,026,358 use an aromatic solvent saturated with carbon dioxide as the diluent. U.S. Pat. No. 5,139,088 taught a process in which an aromatic fraction of the extracted oil was recirculated into the reservoir formation to act as the diluent, but this recirculated fraction was not mixed with other diluent material.

U.S. Pat. No. 5,117,907 taught enhanced oil recovery using supercritical carbon dioxide to which trichloroethane was added in order to increase density and viscosity of the supercritical carbon dioxide. U.S. Pat. No. 4,800,957 taught the use of alcohols or ethylene glycol as additive to supercritical carbon dioxide for a similar purpose. These documents do not suggest that there was any asphaltene precipitation even in the absence of the additive.

SUMMARY OF THE INVENTION

When treating a formation with a viscosity reducing diluent, very large quantities of that diluent are required. If an asphaltene solvent is added to the diluent, even if added as only a small percentage of the mixture, this solvent will be required in large quantities and represent a very considerable expense. Yet the prior literature gives little or no attention to prediction, still less to quantitative or even semi-quantitative prediction, of the magnitude of asphaltene precipitation, nor to quantitative relationship between precipitated asphaltene and the amount of added solvent.

Notwithstanding the recent teaching of Buckley et al, we have discovered that when oil is diluted with a substantial proportion of a viscosity reducing diluent, solubility parameter is an effective tool for quantitatively describing and predicting asphaltene precipitation. This invention calls for a determination of solubility parameter in relation to the oil and use of solubility parameter in forecasting asphaltene precipitation in a reservoir formation. We have found that, for an individual oil, the solubility parameter is sufficiently independent of the identity of the diluent material and any added solvent that measurements made with one combination of materials can be used to make predictions for others. Moreover, this is not confined to circumstances where precipitation is brought about by a substance which takes liquid form under ambient conditions. In particular, it is possible to make predictions about precipitation when using carbon dioxide in supercritical form at reservoir temperature and pressure, by using a determination of solubility parameter in relation to the oil, together with the known relationship between the pressure, temperature and solubility parameter of supercritical carbon dioxide.

When supercritical carbon dioxide is employed, the amount of material which is precipitated may well be greater than the amount which can be precipitated by the addition of n-pentane or n-heptane. This is consistent with the very low Hildebrand solubility parameter which supercritical carbon dioxide can provide. It will be appreciated that in such circumstances the precipitated material includes more than is normally defined as asphaltene and it must therefore include other fairly polar material from the crude oil. Consequently the precipitated material will, when appropriate, be referred to below as the "asphaltic precipitate" since it may include both asphaltene as normally defined and other petroleum material (for instance part of the fraction normally identified as resin) which has precipitated along with the asphaltene.

As mentioned above, formation damage during oil recovery has been recognised as a significant issue. Ability to predict the magnitude of precipitation within a reservoir formation makes it possible to assess whether a proposed diluent mixture will avoid the risk of unacceptable formation damage and also avoid significant unnecessary expenditure.

In a first aspect of this invention, there is provided a method of forecasting asphaltic precipitation when injecting a viscosity reducing diluent into a reservoir formation, comprising
    determining a relationship between precipitation by a diluent and a solubility parameter of the diluted oil,
    utilizing that relationship with solubility parameter to forecast the magnitude of asphaltic precipitation within the formation when injecting a predetermined viscosity reducing diluent into the formation.

This solubility parameter is preferably Hildebrand solubility parameter. The Hildebrand solubility parameter (usually designated δ) of a material is defined as the square root of its cohesive energy density, which is equal to its heat of vaporisation divided by molar volume. It is expressed in units of $MPa^{1/2}$ or in units of $(cal/cc^3)^{1/2} = cal^{1/2}cm^{-3/2}$.

Although we have preferred to work with the well-known Hildebrand parameter, other systems of solubility parameter have been proposed and could be used as an alternative. Moreover, although it is envisaged that a value of Hildebrand solubility parameter will be determined, it would be within the scope of this invention to determine a relationship with a parameter value (constituting a form of solubility parameter) which is mathematically related to the Hildebrand solubility parameter.

The action to be taken after making a forecast about asphaltic precipitation is of course a matter of choice. If it is a forecast that precipitation will be large enough to cause unacceptable formation damage, the consequence might be a decision not to proceed with the injection of a viscosity reducing diluent into the reservoir. On the other hand a decision to proceed with injection of a viscosity reducing diluent might be justified by a forecast that there will be no precipitation or that the amount of precipitate will be sufficiently small that the reservoir permeability will only be reduced by a small and acceptable amount.

It is likely that any forecast of asphaltene precipitation will be only one of several factors taken into account in a feasibility study for possible introduction of a viscosity-reducing diluent into a reservoir. Other factors likely to be taken into account include the permeability of the reservoir formation, measurements of the viscosity of the oil (perhaps both before dilution and upon dilution with a predetermined amount of diluent), the pressure and temperature in the reservoir, and also the structure of the reservoir as for example determined by seismic studies, as well as of course cost benefit considerations.

The relationship between precipitation by a diluent and solubility parameter of the diluted oil may be one factor taken into account in a detailed computer model or simulation used to forecast the magnitude of asphaltic precipitation at various points in the reservoir and more generally to predict the effects of injecting a viscosity reducing diluent into the reservoir formation.

A second aspect of this invention provides a method (which may be both a method of forecasting precipitation and a method of recovering oil) wherein the said steps of determining a relationship and utilizing that relationship to make a forecast are followed by a step of injecting a viscosity reducing diluent into the reservoir.

In a further aspect, this invention utilizes the relationship with solubility parameter to assist in the design of a viscosity reducing diluent mixture. Thus in this aspect, the invention provides a method of assessing an oil reservoir formation and recovering oil therefrom, comprising the steps of:

determining a relationship between asphaltic precipitation and solubility parameter of diluted oil, utilising that relationship to predetermine proportions of a non-polar asphaltene precipitant and a more polar liquid (which may itself be a mixture) in a viscosity reducing diluent mixture for the oil, and injecting the predetermined diluent mixture into the reservoir to reduce viscosity of oil therein and assist recovery of oil from the reservoir.

The relationship between precipitation and solubility parameter of diluted oil may be a graph or formula relating the amount of precipitate to a solubility parameter of diluted oil. However, what is determined preferably consists of, or includes, the value of a solubility parameter of diluted oil corresponding to the onset of asphaltene precipitation.

The onset point for asphaltene precipitation is a concept which has been recognized in the literature. In the context of a titration experiment in which n-alkane is progressively added, it is the point at which precipitation begins. It is a point where the mixture of oil and diluent is such that, when it reaches equilibrium, the amount of asphaltene precipitation is minuscule. Such a mixture is at the point where a graph which plots amount of precipitate against composition falls to zero and intercepts the composition axis.

The general formula for solubility parameter $\delta_{mix}$ of an oil-plus-diluent mixture is $$\delta_{mix} = \phi_{oil}\delta_{oil} + \phi_{diluent}\delta_{diluent} \quad (I)$$

and at the onset point this can be written as $$\delta_{onset} = \phi_{oil}\delta_{oil} + \phi_{diluent}\delta_{diluent} \quad (II)$$

where:
$\delta_{onset}$ is the solubility parameter of the oil-plus-diluent mixture at the onset of precipitation;
$\phi_{oil}$ and $\phi_{diluent}$ are the volume fractions of oil and added diluent liquid respectively, and
$\delta_{oil}$ and $\delta_{diluent}$ are the solubility parameters of the oil and diluent respectively.

Because the chosen diluent lowers the solubility parameter of the mixture in order to bring it to the point of precipitation, $\delta_{diluent}$ must be less than $\delta_{oil}$.

No precipitation occurs in mixtures where the solubility parameter $\delta_{mix}$ of the mixture is above $\delta_{onset}$ whereas in mixtures where the solubility parameter $\delta_{mix}$ of the mixture is below $\delta_{onset}$ some of the asphaltene originally present in the oil precipitates. When equilibrium is reached, some of the asphaltene originally present in the oil has precipitated and less of the total asphaltene remains in suspension.

We have found (as will be demonstrated in more detail below) that when oil is mixed with a substantial quantity of diluent liquid, such as 1 volume oil to 40 volumes of liquid, the solubility parameter $\delta_{onset}$ of the mixed composition (i.e. diluted oil) associated with the onset of asphaltene precipitation has a critical value which is not dependent on the identity of the added liquid but is the same for a range of oil-diluting liquids and mixtures. This critical value will be denoted as $\delta_{onset-crit}$.

When dilution is substantial, $\phi_{oil}\delta_{oil}$ which is the first term in the above formula (II) becomes small and in consequence the solubility parameter $\delta_{diluent}$ of the diluent is at a value which is close to $\delta_{onset-crit}$ and will be denoted $\delta_{dil-crit}$. (The distinction between these two values is that $\delta_{dil-crit}$ is the solubility parameter of the added diluent at the onset point whereas
$\delta_{onset-crit}$ is the solubility parameter of diluted oil at the same point.) If the mixture is made with a liquid of solubility parameter higher than $\delta_{dil-crit}$ precipitation will not occur. Conversely, if a mixture is made with a liquid of lower solubility parameter than $\delta_{dil-crit}$, then precipitation should be expected, at least at substantial dilution.

There are contentions in the literature that $\delta_{onset}$ changes with dilution of crude oil. We have not observed the relationship between asphatic precipitation and solubility parameter of diluted oil to vary with dilution. It is especially clear that when there is substantial dilution, the relationship with solubility parameter is not governed by the identity of the diluent. Consequently, it is possible to use this relationship for forecasting asphaltic precipitation. Of course, when a diluent is pumped into a reservoir formation, dilution is progressive. Initially some of the oil in the formation will be diluted to only a small extent as it mixes with the diluent and the extent of dilution will increase, although not uniformly throughout the formation, as more diluent is pumped in. It can be expected that a zone of diluted oil will form between incoming diluent and undiluted oil. Within this zone the proportions of oil and diluent will vary.

Initially the solubility parameter of the oil in the formation must exceed the onset value, i.e. $\delta_{oil} > \delta_{onset}$. If this were not so then the oil would be unstable and asphaltene would be precipitating from it, even within the reservoir formation. As the oil is diluted, the solubility parameter of the diluted oil is given by the above formula (I):

$$\delta_{mix} = \phi_{oil}\delta_{oil} + \phi_{diluent}\delta_{diluent} \quad (I)$$

where initially $\phi_{diluent}$ is zero and is one. Assuming that the diluent has been chosen so that $\delta_{diluent} < \delta_{oil}$ the term $\phi_{oil}\delta_{oil}$ will become progressively smaller and the value of $\delta_{mix}$ will fall as the proportion of diluent increases.

As pointed out above, when dilution becomes substantial, $\phi_{oil}\delta_{oil}$ will become small and the solubility parameter $\delta_{mix}$ of the overall mixture will approximate to $\delta_{diluent}$. This condition, in which dilution is substantial and $\phi_{oil}\delta_{oil}$ is small, represents an approximate endpoint condition. Before it is reached, $\delta_{mix}$ will be greater, and precipitation will be less than when the endpoint condition is eventually reached.

Consequently, determination of a relationship between solubility parameter and asphaltic precipitation, as this invention requires, can be used to forecast whether precipitation will be encountered if the reservoir oil becomes sufficiently diluted with the chosen viscosity reducing diluent and/or to forecast the maximum amount of precipitation which can be expected if the reservoir oil becomes sufficiently diluted.

In the event that a viscosity reducing diluent is chosen to have $\delta_{diluent}$ which is not less than $\delta_{onset\text{-}crit}$, dilution will reduce the solubility parameter $\delta_{mix}$ of the mixture but it will never fall to $\delta_{onset\text{-}crit}$ and it would be forecast that precipitation will not happen at any dilution.

As already mentioned, the way in which a forecast about asphaltic precipitation is used is to some extent a matter of choice, although the permeability of the reservoir formation needs to be considered. If the permeability of the reservoir formation is low, it may well be decided to design a diluent mixture so that it will have a solubility parameter which is equal to $\delta_{onset\text{-}crit}$ or slightly greater, so as to prevent precipitation. When formulating a diluent mixture from an asphaltene precipitant and an asphaltene solvent, it will generally be the case that the asphaltene solvent will be the more expensive material but only used as a minority of the mixture. By predetermining the diluent mixture to have a solubility parameter which is only slightly greater than the critical value $\delta_{onset\text{-}crit}$ the volume fraction of the (more costly) asphaltene solvent will be no greater than necessary.

However, if the reservoir formation permeability is sufficiently high, it may be decided that some asphaltic precipitation in the formation can be tolerated. This will be advantageous because asphaltene is of low commercial value relative to other fractions of the oil and is difficult to convert to more valuable products during the refining process. Producing oil with all or some of the asphaltene left behind in the reservoir formation would constitute an in-situ upgrading of the oil, increasing the commercial value of the oil produced. Somewhat similarly, it might be decided to design a viscosity reducing diluent mixture so as to have a predetermined solubility parameter which would, if the oil becomes substantially diluted with that diluent mixture, precipitate only part of the asphaltene.

Once the required solubility parameter of a diluent mixture has been decided, the proportions of constituents to be included in the diluent mixture can be determined by applying the general formula $$\delta_{diluent} = \Sigma \phi_i \delta_i \quad (III)$$

where $\phi_i$ and $\delta_i$ respectively denote the volume fraction and solubility parameter of an individual constituent. For a mixture of one asphaltene precipitant and one asphaltene solvent, this becomes:

$$\delta_{diluent} = \phi_{precipitant} \delta_{precipitant} + \phi_{solvent} \delta_{solvent} \quad (IV)$$

A viscosity reducing diluent mixture may contain other materials in addition to the asphaltene precipitant and asphaltene solvent mentioned already. Possibilities include surfactants, viscosity enhancing agents, foam generating agents and/or foam control agents.

The relationship between asphaltic precipitation and solubility parameter of diluted oil may be a graph or formula relating the amount of precipitate to a solubility parameter of diluted oil. However, what is determined preferably consists of, or includes, the value of a solubility parameter of diluted oil corresponding to the onset of asphaltene precipitation. The step of determining a relationship with solubility parameter requires experimental work with a sample of the crude oil of interest. This experimental work may comprise performing a series of experiments on oil from the reservoir, each experiment comprising mixing a measured amount of oil from the reservoir with a measured amount of a liquid which is at least partially miscible with the oil, where the experiments in the series differ from one another in the proportions of oil and liquid and/or in a solubility parameter of the liquid, and allowing the mixture to reach equilibrium. The experimental result from each experiment will be an observation as to whether asphaltene separation occurs, and/or a measurement of the amount of separated asphaltene. These experimental results, together with the amounts of the oil and liquids and the solubility parameters of the liquids, can be used to determine the solubility parameter corresponding to the onset of asphaltene precipitation.

It is an advantage that these experiments can be carried out using liquids which are not the same as the viscosity reducing diluent which is contemplated for eventual use. It is possible to perform the experiments with liquids which are convenient to handle in a laboratory but which are likely to be prohibitively expensive to inject in quantity into a reservoir.

If an experiment requires only the detection of precipitation, this may be done by visual inspection, possibly under a microscope. Detecting precipitation by observing a change in fluorescence has been disclosed in WO 01/20322. A method using near infra-red spectroscopy has been described in U.S. Pat. No. 7,067,811. If an experiment requires determination of the amount of precipitated asphaltene, collection of the precipitate may for example be by filtration. It is very important to separate the liquid and precipitate completely, so the precipitate and filter paper should be thoroughly washed so as to wash all filtrate off the precipitate. This washing can be done using additional quantities of the liquid which was added to the oil in the experiment. Another possibility is to separate the precipitate by centrifugation, in which case the pellet of separated solids should analogously be thoroughly washed with additional quantities of the liquid which was added to the oil in the experiment so as to wash off all traces of the supernatant liquid.

In one preferred series of experiments, each experiment comprises mixing a measured amount of oil from the reservoir with a measured amount of a liquid which is at least partially miscible with the oil, where the experiments differ in the solubility parameter of the liquid. The experimental result of each experiment is a measurement of the amount of separated asphaltene. These measurements can be used to determine a relationship between the solubility parameter of the added liquid and the amount of asphaltene precipitated. This in turn can be used to determine a solubility parameter for a liquid which, when mixed with the oil in the same proportion as in the experiments, will give an overall mixture at the "onset point", where asphaltene precipitation is minuscule. This lies between higher values of solubility parameter at which precipitation does not occur and lower values at which precipitation is greater.

It is useful also to perform a series of experiments which each comprise mixing a measured amount of oil from the reservoir with a measured amount of a liquid which is at least partially miscible with the oil, where the experiments differ in the proportions of oil and liquid and the experimental result is an observation whether asphaltene precipitation occurs. By combining the experimental results from the two series, together with the amounts of the oil and liquids and the solubility parameters of the liquids, it is possible to determine the solubility parameter of diluted oil at the onset of asphaltene precipitation, a relationship between solubility parameter and the amount of asphaltene precipitated, and also the solubility parameter of the oil itself. All of these can be considered to be properties of the individual oil because they are all governed by the oil composition when other variables are kept constant. The relationship between the amount of asphaltene precipitated and solubility parameter may be linear but it is entirely possible to make forecasts, in accordance with this invention, even if the relationship is non-linear.

The added liquid which is used in each experiment may be a mixture or a single substance. A range of solubility parameters can be provided by selecting single substances of increasing polarity, but in practice it is more convenient to use mixtures of liquids, at least one of which, when added on its own to crude oil, precipitates asphaltene and at least one of which is a solvent for asphaltene. In particular it is preferred to use mixtures rather than using n-alkanes longer than 7 carbon atoms because these long alkanes have been observed to form gels with some crude oils even at substantial dilution and this hinders the separation of precipitated asphaltene.

The asphaltene precipitant in such a mixture may conveniently be a straight or branched chain paraffin which is normally liquid (i.e. is liquid under ambient conditions of 20° C. and 1 bar pressure) such as n- or iso-forms of pentane, hexane or heptane. These have Hildebrand solubility parameter in a range from 13.5 to 15.2 $MPa^{1/2}$. A range of compounds may be used as the asphaltene solvent in a mixture. Such a compound preferably has a Hildebrand solubility parameter in the range from 17 or 17.5 up to 20 or 21 $MPa^{1/2}$. This asphaltene solvent may be an aromatic compound such as toluene or xylene but an alternative possibility is that it may be an aliphatic compound wherein the molecule contains seven or less carbon atoms and also has one or more features which increase polarity compared to linear alkanes, such as a cycloaliphatic ring or the presence of one or more chlorine atoms or an ether group. A feW examples of possible compounds, which illustrate the diversity of possibilities, are set out in the following table:

| Compound | Hildebrand solubility parameter ($MPa^{1/2}$) |
| --- | --- |
| cyclohexane | 16.8 |
| dichloromethane | 20.2 |
| tetrahydrofuran | 19.5 |
| 1,1,2-trichloroethane | 20.1 |
| pyrrolidine | 20.4 |
| cyclohexylamine | 18.6 |
| toluene | 18.2 |

When carrying out these experiments, it is preferred to premix the asphaltene solvent and asphaltene precipitant in the chosen proportions and then add the resulting mixture to the crude oil. Mixing the crude oil with an asphaltene solvent and then adding an asphaltene precipitant risks a possibility that the colloidal suspension of asphaltene in the crude oil would be perturbed by the temporary excess of asphaltene solvent.

Although it is convenient to carry out the experiments required by this invention with an asphaltene precipitant which is liquid under ambient laboratory conditions of temperature and pressure, the concept of solubility parameter can be applied to liquefied gases and supercritical fluids, and we have found that data which is obtained with supercritical carbon dioxide as the precipitant is consistent with data obtained when an n-alkane is used as the precipitant. In consequence the value of solubility parameter determined by means of experiments can be used to predetermine the proportions in a viscosity reducing diluent mixture for enhanced oil recovery in accordance with this invention, where the viscosity reducing diluent may comprise an asphaltene precipitant which is a normally liquid aliphatic hydrocarbon mixture such as naphtha, or a normally gaseous hydrocarbon in liquefied form such as liquefied methane, or a supercritical fluid such a supercritical carbon dioxide, or a combination of these possibilities. "Normally liquid" signifies liquid form under ambient conditions of temperature and pressure such as 20° C. and 1 bar pressure.

In order to make predictions for a reservoir formation, the relationship between asphaltic precipitation and solubility parameter should be determined for the temperature of the reservoir formation. Experimental work determining the amount of asphaltic precipitation when diluents are mixed with oil can be carried out at temperatures above ambient, for instance by choosing liquids with sufficiently high boiling points and by keeping the vessels in which the samples are equilibrated in an environment maintained at the chosen temperature, such as a water bath whose temperature is regulated by thermostat.

If the viscosity reducing diluent to be injected into the reservoir formation includes a compressible fluid, such as supercritical carbon dioxide, the effect of reservoir pressure and temperature on solubility parameter should both be taken into account. Solubility parameter values for supercritical carbon dioxide at various temperatures and pressures have been published by Allada in "Solubility parameters of Supercritical Fluids", Ind. Eng. Process Des. Dev., vol 23, pages 344-348 (1984).

A viscosity-reducing diluent should preferentially partition into oil rather than into any aqueous phase encountered in the reservoir formation. In the case of a diluent mixture, all its components should preferentially partition into oil, because anything which partitions into formation water will be depleted from the oil phase. Preferential partitioning into oil can be signified by an oil/water partition coefficient which is greater than one and preferably greater than 10.

A viscosity reducing diluent mixture may be a mixture of at least one material which (on its own) is an asphaltene precipitant and at least one material which (on its own) is an asphaltene solvent. In further aspects of this invention, the inventors have considered what materials are suitable as asphaltene solvents. After examining the abilities of a number of solvents to form homogenous liquid mixtures with a number of different crude oils, the inventors prefer that an asphaltene solvent should not only have Hildebrand parameter within a specified range but also have Hansen solubility parameters within specified ranges.

Hansen solubility parameters are a set of three parameters with the same units as the Hildebrand parameter but which denote separately a dispersion component ($\delta_d$), a polar component ($\delta_p$) and a hydrogen bonding component ($\delta_h$). These are related to the Hildebrand parameter $\delta$ by the formula $$\delta^2 = \delta_d^2 + \delta_p^2 + \delta_h^2$$

We prefer that materials to be used as an asphaltene solvent in a viscosity reducing diluent mixture should have Hildebrand and Hansen solubility parameters in the ranges:

| Hildebrand | $\delta$ | 16.4-20.4 $MPa^{1/2}$, preferably 17 to 20.5 $MPa^{1/2}$ |
| --- | --- | --- |
| Hansen | $\delta_d$ | 14.5-19.6 $MPa^{1/2}$ |
| | $\delta_p$ | 0-8.2 $MPa^{1/2}$ |
| and | $\delta_h$ | 0-6.8 $MPa^{1/2}$ |

The upper limits for these ranges, particularly those for $\delta_p$ and $\delta_h$, exclude materials which are very polar and/or include hydroxyl groups and consequently are poor asphaltene solvents, typically having low solubility in oil and low oil/water partition coefficients. Methanol, for instance has Hansen solubility parameters of $\delta_d$=15.1 $\delta_p$=12.3 and $\delta_h$=22.3 so that two of the three parameters fall outside the above ranges.

Both Hildebrand and Hansen solubility parameters have been published for many chemical compounds, for example in "The CRC Handbook of Solubility Parameters and Other Cohesion Parameters" by A F M Barton and "Hansen solubility parameters: a user's handbook" by C H Hansen.

A number of materials with preferred Hildebrand and Hansen parameters are set out in the following table and illustrate considerable diversity of structures and substituents amongst compounds with solubility parameters in these preferred ranges.

| Compounds | Hansen parameters ||| Hildebrand |
|---|---|---|---|---|
| | $\delta_d$ (MPa$^{1/2}$) | $\delta_p$ (MPa$^{1/2}$) | $\delta_H$ (MPa$^{1/2}$) | $\delta$ (MPa$^{1/2}$) |
| Hydrocarbons | | | | |
| cyclohexane | 16.8 | 0 | 0.2 | 16.8 |
| cis decahydronaphthalene | 18.8 | 0 | 0 | 18.8 |
| benzene | 18.4 | 0 | 2 | 18.6 |
| ortho-xylene | 17.8 | 1.0 | 3.1 | 18.0 |
| Halohydrocarbons | | | | |
| chloromethane | 15.3 | 6.1 | 3.9 | 17.0 |
| dichloromethane | 18.2 | 6.3 | 6.1 | 20.3 |
| 1,1-dibromoethane | 18.4 | 5.1 | 6.5 | 20.2 |
| dichlorofluoromethane | 15.8 | 3.1 | 5.7 | 17.1 |
| ortho dichlorobenzene | 19.2 | 6.3 | 3.3 | 20.5 |
| 1-chlorobutane | 16.4 | 5.5 | 2.1 | 17.4 |
| Ethers | | | | |
| methoxybenzene | 17.8 | 4.1 | 6.8 | 19.5 |
| furan | 17.8 | 1.8 | 5.3 | 18.6 |
| bis-(m-phenoxyphenol)ether | 19.6 | 3.1 | 5.1 | 20.5 |
| Ketones | | | | |
| cyclohexanone | 17.8 | 6.3 | 5.1 | 19.6 |
| diethylketone | 15.8 | 7.6 | 4.7 | 18.1 |
| Esters | | | | |
| Dioctyl phthalate | 16.6 | 7.0 | 3.1 | 18.2 |
| Diethyl carbonate | 16.6 | 3.1 | 6.1 | 17.9 |
| Others | | | | |
| cyclohexylamine | 17.4 | 3.1 | 6.6 | 18.9 |
| stearicacid | 16.4 | 3.3 | 5.5 | 17.6 |
| benzaldehyde | 19.4 | 7.4 | 5.3 | 21.5 |

Of course the preferred ranges of Hansen solubility parameter do not only define possible asphaltene solvents for use in viscosity reducing diluent mixtures, they can also be taken as defining possible asphaltene solvents for use in the experiments required by this invention.

Toluene, xylene and trimethylbenzene, which are already well recognised as asphaltene solvents, fall within the preferred ranges. However, these materials are relatively expensive even though they are derived from crude oil.

We have recognised that some aliphatic compounds are suitable as asphaltene solvents to be included in a viscosity reducing diluent mixture. These compounds include cycloaliphatic rings, and/or olefinic unsaturation and/or ester or ether linkages, which make them more polar than straight-chain alkanes while falling within the preferred ranges of Hansen parameters given above. Preferably these compounds have from 4 or 6 up to 40 carbon atoms. We may prefer that they contain only carbon, hydrogen and oxygen atoms. If any oxygen is present, it may be preferred that it is present only in ester or ether groups. Unless the number of carbon atoms is large it is also preferred to avoid hydroxyl groups. It is envisaged that such an aliphatic compound will not include any aromatic ring.

One preferred sub-group is hydrocarbons having from 8 to 20 carbon atoms, preferably from 10 to 15 and more especially 10 carbon atoms, including at least one cycloaliphatic ring and/or including at least one olefinic unsaturation. This category includes some naturally occurring terpenes, notably pinenes and limonene. Limonene, which is a C10 terpene, is a natural product available commercially in substantial quantities. An advantage of hydrocarbons, such as these, as asphaltene solvent is that they could be recovered from the produced oil by distillation during the refining process. Although it would not be economic to isolate them completely from constituents of the oil, they could be concentrated in a refinery fraction which was returned to the oilfield and included in a viscosity-reducing diluent mixture.

Another sub-group of materials which can be included as asphaltene solvents are aliphatic esters incorporating alkyl or alkenyl groups of 11 to 22 carbon atoms. This sub group includes esters of formula

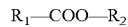

$R_1$—COO—$R_2$ where $R_1$ and $R_2$ are straight or branched aliphatic hydrocarbon chains optionally including olefinic unsaturation and having a length of 1 to 22 carbon atoms and where $R_1$ and $R_2$ together contain 12 to 44 carbon atoms. One possibility within this formula is esters of long chain alcohols, so that $R_1$ is methyl ethyl, propyl or butyl and $R_2$ has 11 to 22 carbon atoms. Another possibility is esters where both $R_1$ and $R_2$ contain at least five carbon atoms, possibly from 5 to 10 carbon atoms. A third and more readily available possibility is alkyl esters of long chain fatty acids in which $R_1$ contains 11 to 18 carbon atoms and $R_2$ is methyl ethyl, propyl or butyl. These can be obtained by transesterification of natural oils and fats. Such esters may be esters of saturated acids, for instance methyl stearate, or esters of unsaturated acids, for instance methyl oleate.

Other possible esters are diesters of formula

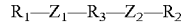

$R_1$—$Z_1$—$R_3$—$Z_2$—$R_2$ where $Z_1$ and $Z_2$ are each COO or OCO, $R_1$, $R_2$ and $R_3$ are straight or branched aliphatic hydrocarbon chains optionally including olefinic unsaturation and each having a length of 1 to 22 carbon atoms, and $R_1$, $R_2$ and $R_3$ together contain from 11 to 66 carbon atoms.

A third possibility is triglycerides of formula

$R_1$COO—$CH_2$—CH(OCO$R_4$)—$CH_2$—OCO$R_2$ where $R_1$, $R_2$ and $R_4$ are straight or branched aliphatic hydrocarbon chains optionally including olefinic unsaturation and each having a length of 1 to 22 carbon atoms, and $R_1$, $R_2$ and $R_4$ together contain from 11 to 66 carbon atoms. A mixture of triglycerides may be provided by one or more natural oils, in which case $R_1$, $R_2$ and $R_4$ preferably each have from 11 to up to 17 or 21 carbon atoms. In particular, palm oil may be used.

Solubility parameters of some examples of these materials are set out in the following table:

| Compounds | Hansen parameters | | | Hildebrand |
| --- | --- | --- | --- | --- |
| | $\delta_d$ (MPa$^{1/2}$) | $\delta_P$ (MPa$^{1/2}$) | $\delta_H$ (MPa$^{1/2}$) | $\delta$ (MPa$^{1/2}$) |
| d-limonene | 16.4 | 0.2 | 0.2 | 16.4 |
| α-pinene (racemic) | 15.5 | 4.3 | 0 | 16.1 |
| methyl ester of soybean oil | 16.2 | 4.9 | 5.9 | 17.9 |
| glyceryl tripalmitate | 18.0 | 4.3 | 4.3 | 19.0 |

An important feature, whose significance has not previously been recognized, is that these aliphatic materials have good solubility in supercritical carbon dioxide. Notably, limonene has a solubility in supercritical carbon dioxide which increases very rapidly with increasing pressure, reaching as high as 50% by weight above 100 bar at 45° C. (as reported by Berna et al, J. Chem. Eng. Data 2000 Vol 45 pp 724-7). One possibility here is to use a mixture of materials from both the hydrocarbons subgroup and the esters subgroup. An example of such a mixture would be limonene and methyl soybean oil. Another would be a mixture of limonene and palm oil. Such mixtures would be a more polar than limonene alone, and would have good solubility in supercritical carbon dioxide.

Generally it is envisaged that a viscosity reducing diluent will be injected into a reservoir through one or more injection wells and will assist recovery of oil through one or more producing wells both by reducing viscosity in the reservoir and by exerting pressure which will drive oil towards the producing wells. The customary arrangement of a plurality of producing wells arranged around an injection well may be used. However, it is also possible that this invention could be used to forecast the amount of precipitation when injecting a diluent into a reservoir as a near-wellbore treatment of a production well.

When a viscosity reducing diluent which is a mixture is injected into a reservoir formation, it will be very desirable that it exists as a single phase at the reservoir temperature and pressure so that its constituents are not separated as they flow through the formation. It may therefore be desirable to mix the constituents downhole, so as to ensure that they form a single phase in the required proportions at that point, for example by delivery through coiled tubing which defines two concentric flow paths. Alternatively, if they are mixed at the surface to form a suspension of the solvent as fine droplets dispersed in the asphaltene precipitant, it will be important that the flow path down the injection well maintains the dispersion in its intended proportions until temperature and pressure conditions form it into a single phase. A further possibility would be to pump the constituents of the mixture separately down a wellbore, in known amounts, thus controlling the proportions delivered into the reservoir formation, but relying on the constituents mixing together in the near-wellbore region of the formation. Yet another possibility would be to place a container of the more polar component of a mixture at a downhole location when completing a well, and later operate a valve on the contained to dispense from this into a stream of asphaltene precipitant as that precipitant is pumped down from the surface.

BRIEF DESCRIPTION OF THE DRAWINGS

FIG. 6 shows an arrangement with a production well and an injection well; and

FIG. 7 schematically shows experimental work used as input for a computer simulation.

DETAILED DESCRIPTION

Experimental work was carried out using a sample of dewatered heavy crude oil with an API gravity of 9.4 and a density of 0.988 g/mL at 40° C. When diluted with 40 volumes of n-pentane, approximately 18% by weight asphaltene precipitated from this heavy oil.

A series of experiments was carried out. In each experiment a 1 gram sub-sample of this heavy crude oil was equilibrated with 40 mL of a viscosity-reducing diluent. A range of diluents was used in separate experiments. One of the diluents was hexane alone, which is an asphaltene precipitant. The others were two component liquid mixtures containing hexane, mixed with known proportions of an asphaltene solvent. Three asphaltene solvents were used: tetrahydrofuran (THF), dichloromethane (DCM) and toluene at several ratios of hexane to the asphaltene solvent. After equilibration for 48 hours in the dark at ambient laboratory temperature and pressure (25° C. and 1 bar) the precipitated solids were separated by filtration (0.45 micron polytetrafluoroethylene filter paper). The separated precipitate and the filter paper were thoroughly washed with additional quantities of the diluent to make sure that no traces of the filtrate remained, then the precipitate was dried and weighed.

Figure 1:
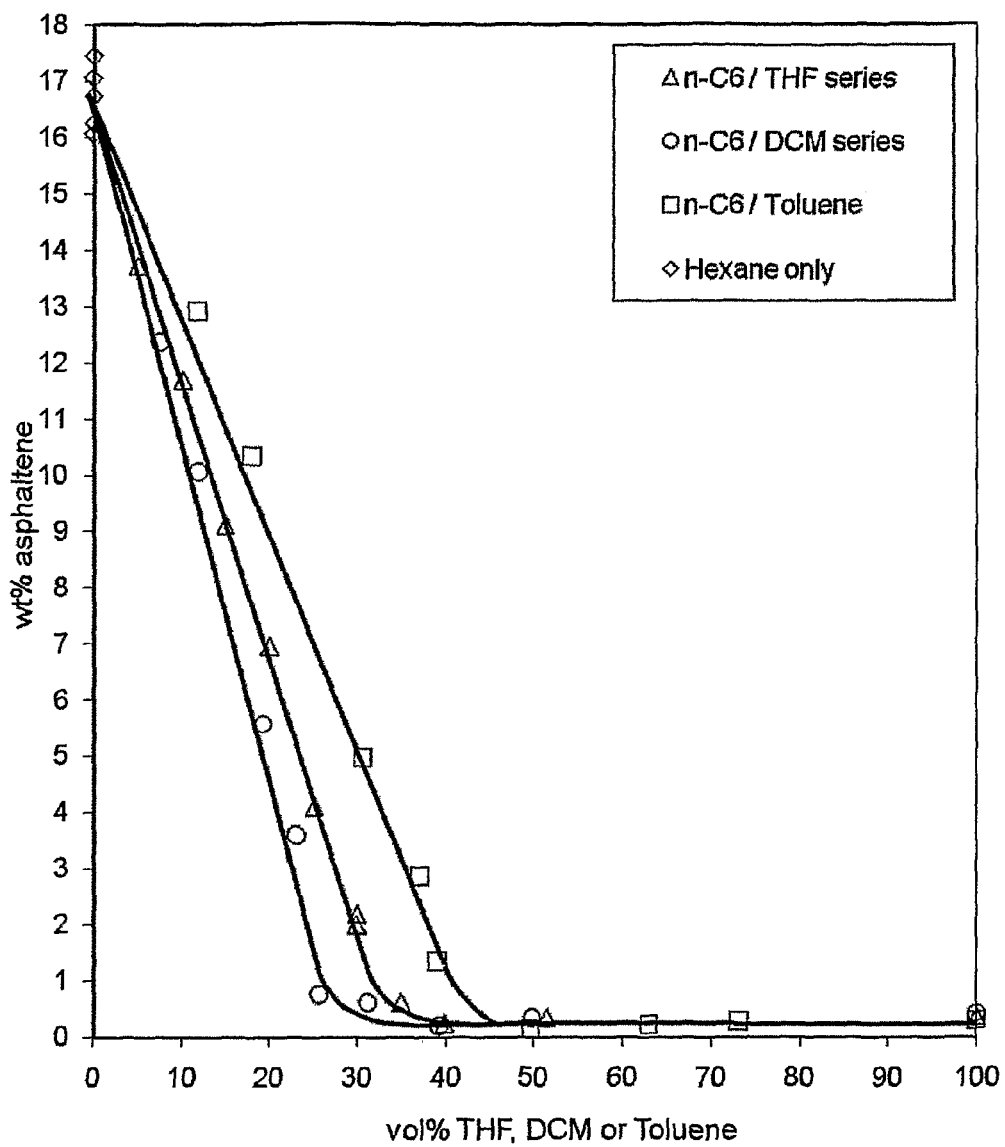
FIG. 1 is a graph showing results from experiments in which oil is mixed with a diluent and the amount of precipitated asphaltene is plotted against volume percentage of asphaltene solvent in the diluent.

FIG. 1 shows the results plotted as weight of precipitate against percentage by volume of asphaltene solvent in the diluent. It can be seen that for each of the three solvents, the graph is a straight line which intersects the horizontal axis. To the left of the intersection point there is precipitation of asphaltene. To the right of the intersection point (ie higher proportions of solvent) there is precipitation of a very small amount (0.29% by weight) of entrained inorganic material but no precipitation of asphaltene. At the intersection point itself precipitation is minuscule. This is the "onset point" and it would be the point of onset of precipitation if the volume fraction of asphaltene solvent in a mixture was progressively reduced by adding hexane. The experiment with hexane alone as the diluent was carried out five times and the five results are shown individually in FIG. 1. Some experimental variation can be seen from the spread of these five points. However, it was observed that if experiments closer to the onset point were replicated, the experimental variation was much smaller.

For each of the mixtures of hexane and asphaltene solvent, the Hildebrand solubility parameter was calculated from the published Hildebrand solubility parameters of the constituents of the mixture, using the formula:

$$\delta_{diluent} = \phi_1 \delta_1 + \phi_2 \delta_2$$

where $\phi_1$ and $\phi_2$ are volume fractions and $\delta_1$ and $\delta_2$ are Hildebrand solubility parameters of constituents 1 and 2 of the diluent mixture. The amount of entrained inorganics was subtracted from the amounts of precipitated asphaltene and the data was then replotted as a graph of precipitated asphaltene deposition against solubility parameter of the diluent. The resulting graph is shown as FIG. 2.

It can be seen from this graph that all the data points now lie on a single line descending to intersect the horizontal axis at a solubility parameter which was determined to be 16.36 $MPa^{1/2}$. This is the onset point and the critical value of solubility parameter of the overall mixture of oil and diluent at this point would be given by the formula $$\delta_{onset\text{-}crit} = \phi_{oil}\delta_{oil} + \phi_{diluent}\delta_{diluent} = \phi_{oil}\delta_{oil} + \phi_{diluent}(\phi_1\delta_1 + \phi_2\delta_2) \quad (V)$$

where (approximating the volume of 1 gram of oil to 1 ml) $\phi_{oil}$ is 1/41, $\phi_{diluent}$ is 40/41, $\delta_{diluent}$ is at its critical value $\delta_{dil\text{-}crit}$ of 16.36 $MPa^{1/2}$ and where, as above, $\phi_1$ and $\phi_2$ are volume fractions and $\delta_1$ and $\delta_2$ are Hildebrand solubility parameters of constituents 1 and 2 of a two component diluent mixture.

Figure 2:
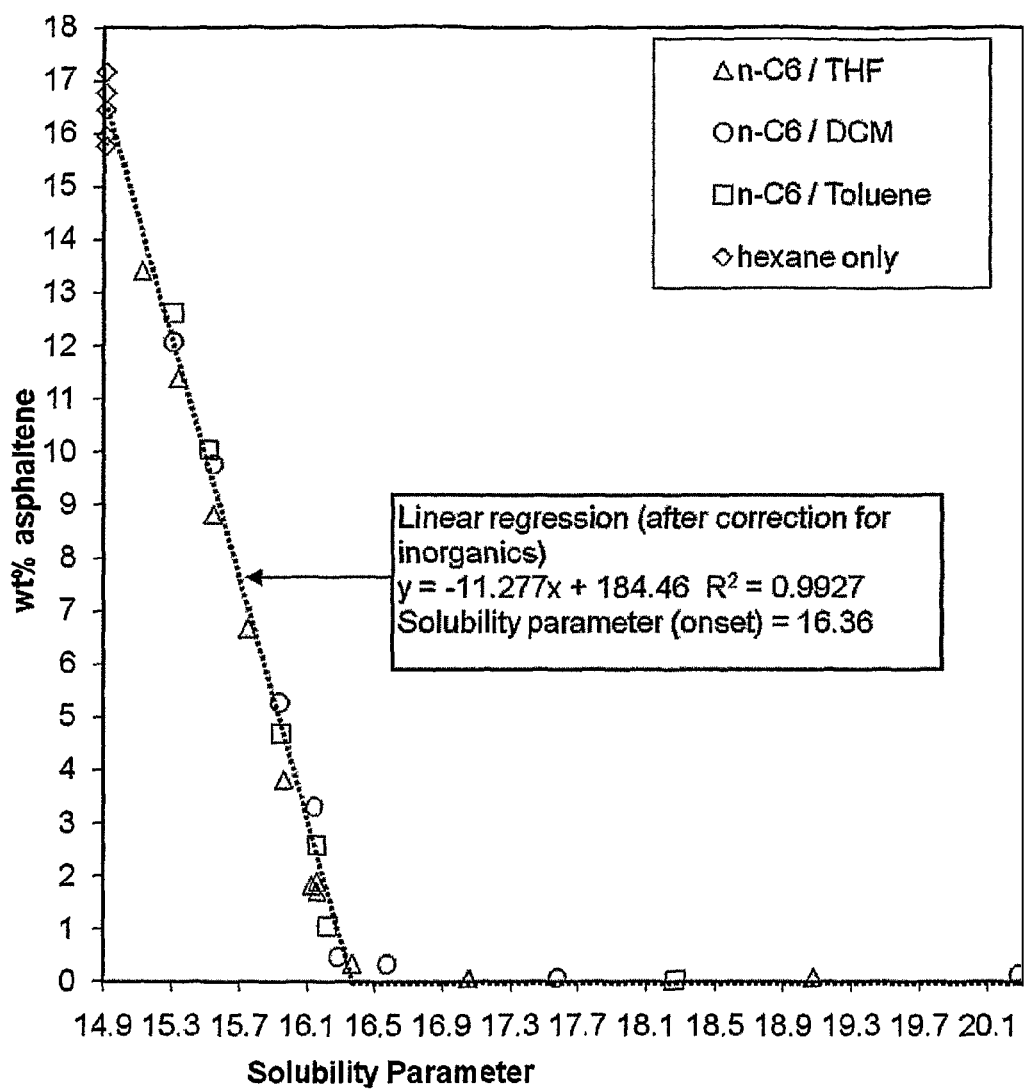
FIG. 2 is another graph showing the same results, but with the amount of precipitated asphaltene plotted against Hildebrand solubility parameter of the diluent.

The regression line fitted to the data in FIG. 2 is described by the formula $$y = -11.277\delta_{mix} + 184.46 \quad (VI)$$

with linear correlation coefficient, $R^2 = 0.9927$, where y is the percent asphaltene precipitate and $\delta_{mix}$ is the solubility parameter of the oil-plus-diluent mixture.

In order to determine $\delta_{onset\text{-}crit}$ and $\delta_{oil}$ a second series of experiments was performed with the proportion of diluent becoming an experimental variable. In these experiments, sub-samples of the same heavy crude oil were equilibrated with a series of increasing volume fractions of the diluents, pentane, heptane and dodecane. Each experiment was carried out by accurately weighing the oil and diluent into a clean glass vial, mixing thoroughly and then allowing the mixture to stand in the dark for at least 48 hours. The mixtures containing dodecane formed gels. After equilibration, each sample was examined using an optical microscope to determine whether asphaltene precipitation had occurred. For each diluent, it was observed that a critical volume fraction of the diluent was required to induce the formation of asphaltene particles in the oil/diluent mixtures. The results bounding the critical fractions are given in the following Table.

| Oil/pentane series $\delta$(pentane) = 14.42 $MPa^{1/2}$ Critical volume fraction = 0.56 | | Oil/heptane series $\delta$(heptane) = 15.25 $MPa^{1/2}$ Critical volume fraction = 0.64 | | Oil/dodecane series $\delta$(dodecane) = 16.12 $MPa^{1/2}$ Critical volume fraction = 0.875 | |
|---|---|---|---|---|---|
| Volume Fraction diluent | Asphaltene particles detected | Volume fraction diluent | Asphaltene particles detected | Volume Fraction diluent | Asphaltene particles detected |
| 0.517 | No | 0.615 | No | 0.850 | No |
| 0.545 | No | 0.630 | No | 0.801 | No |
| 0.554 | No | 0.643 | No | 0.87 | No |
| 0.559 | Yes | 0.653 | Yes | 0.88 | Yes |
| 0.583 | Yes | 0.661 | Yes | 0.90 | Yes |
| 0.594 | Yes | 0.676 | Yes | | |

As indicated by the table, the precipitation of asphaltene was just at the onset point in mixtures containing:

0.44 parts oil and 0.56 parts pentane by volume
0.36 parts oil and 0.64 parts heptane by volume
0.125 parts oil and 0.875 parts dodecane by volume It was assumed that in each of these mixtures of oil and diluent at the onset point, the solubility parameter of the mixture was at the same critical value $\delta_{onset\text{-}crit}$ as the onset point in the first series of experiments at fixed 1:40 dilution. Consequently:

$$\phi_{oil}\delta_{oil} + \phi_{diluent}\delta_{diluent} = \delta_{onset\text{-}crit} = \phi_{oil}\delta_{oil} + \phi_{diluent}\delta_{diluent} \quad (VII)$$

(at onset for 1 g oil/40 mL diluent mixtures) (at onset for each of the three mixtures above)

This reduces to $$1/40 \times \delta_{oil} + 40/41 \times \delta_{dil\text{-}crit} = \phi_{oil}\delta_{oil} + \phi_{diluent}\delta_{diluent} \quad (VIII)$$

(at onset for 1 g oil/40 mL diluent mixtures) (at onset for each of the three mixtures above)

It now becomes possible to calculate $\delta_{oil}$ as the only unknown in the above equation. Three values of $\delta_{oil}$ were calculated using the value of $\delta_{dil\text{-}crit} = 16.36$ $MPa^{1/2}$ obtained from FIG. 2 and each of the critical volume fractions determined above. The three results are given in the following table:

| | $\delta_{oil}$ ($MPa^{1/2}$) | Calculation |
|---|---|---|
| pentane data | 18.96 | $\delta_{oil} = [(0.9753(16.36)) - (0.56(14.42)]/[(1-0.56) - 0.0247]$ |
| heptane data | 18.48 | $\delta_{oil} = [(0.9753(16.36)) - (0.64(15.25)]/[(1-0.64) - 0.0247]$ |
| dodecane data | 18.45 | $\delta_{oil} = [(0.9753(16.36)) - (0.875(16.12)]/[(1-0.875) - 0.0247]$ |

These three values are in good agreement and were averaged to give a Hildebrand solubility parameter for the oil (ie $\delta_{oil}$) of 18.6 $MPa^{1/2}$. Using this average value of $\delta_{oil}$ the value of $\delta_{onset\text{-}crit}$ was calculated as 16.41 $MPa^{1/2}$. It should be recalled that $\delta_{dil\text{-}crit}$ is the solubility parameter of the added diluent at the onset point whereas $\delta_{onset\text{-}crit}$ is the solubility parameter of diluted oil at the onset point. Although their values are close, they are not identical.

Using the mean value of $\delta_{oil} = 18.6$, the data of FIG. 2 was replotted as a further graph of the amount of precipitated asphaltene against solubility parameter of the oil-plus-diluent mixture. This graph is shown as FIG. 3 and it also includes the results from experiments similar to those shown in FIGS. 1 and 2 but obtained using pentane, heptane and dodecane at 40 to 1 dilution. The regression line fitted to the data is described by the equation $$y = -11.563\delta_{mix} + 189.77 \quad (IX)$$

where y is percent asphaltic precipitation and $\delta_{mix}$ is the solubility parameter of the oil-plus-diluent mixture.

The work so far described was extended by an experiment using supercritical carbon dioxide. In this experiment a measured quantity of crude oil was placed in a high-temperature high-pressure (HPHT) cell fitted with a visualisation window and pivotally mounted on a stand so that the cell could be inverted. The cell was maintained at 40° C. The cell was then pressurised with carbon dioxide at 40° C. and 2200 psi (152 bar) pressure, under which conditions carbon dioxide is a supercritical fluid. The cell and its contents were allowed to equilibrate for five days, mixing the contents from time to time by inverting the cell. It could then be seen that there was a sticky asphaltic precipitate on the interior walls of the cell, and two fluid phases in the cell. One fluid phase was supercritical carbon dioxide which had a yellow orange colour, presumably because it had taken up some constituents of the oil. The other fluid phase was an oil phase of dark colour. This latter phase was much more mobile than the original crude oil, presumably because it no longer contained the asphaltic material and/or because it contained dissolved carbon dioxide. After the period of equilibration, the carbon dioxide was vented to atmosphere and the mobile oil phase was run off. The deposit on the walls of the cell, which was observed to be very sticky, was dissolved in dichloromethane and washed into a weighed flask. Solvent was then evaporated and the flask was weighed again, to give the weight of the sticky material.

The Hildebrand solubility parameter of carbon dioxide at 40° C. and 2200 psi was taken as 12.5 Mpa$^{1/2}$ read off from curves published by Allada in "Solubility parameters of Supercritical Fluids" Ind. Eng. Process Des. Dev. vol 23, pages 344-348 (1984).

Figure 3:
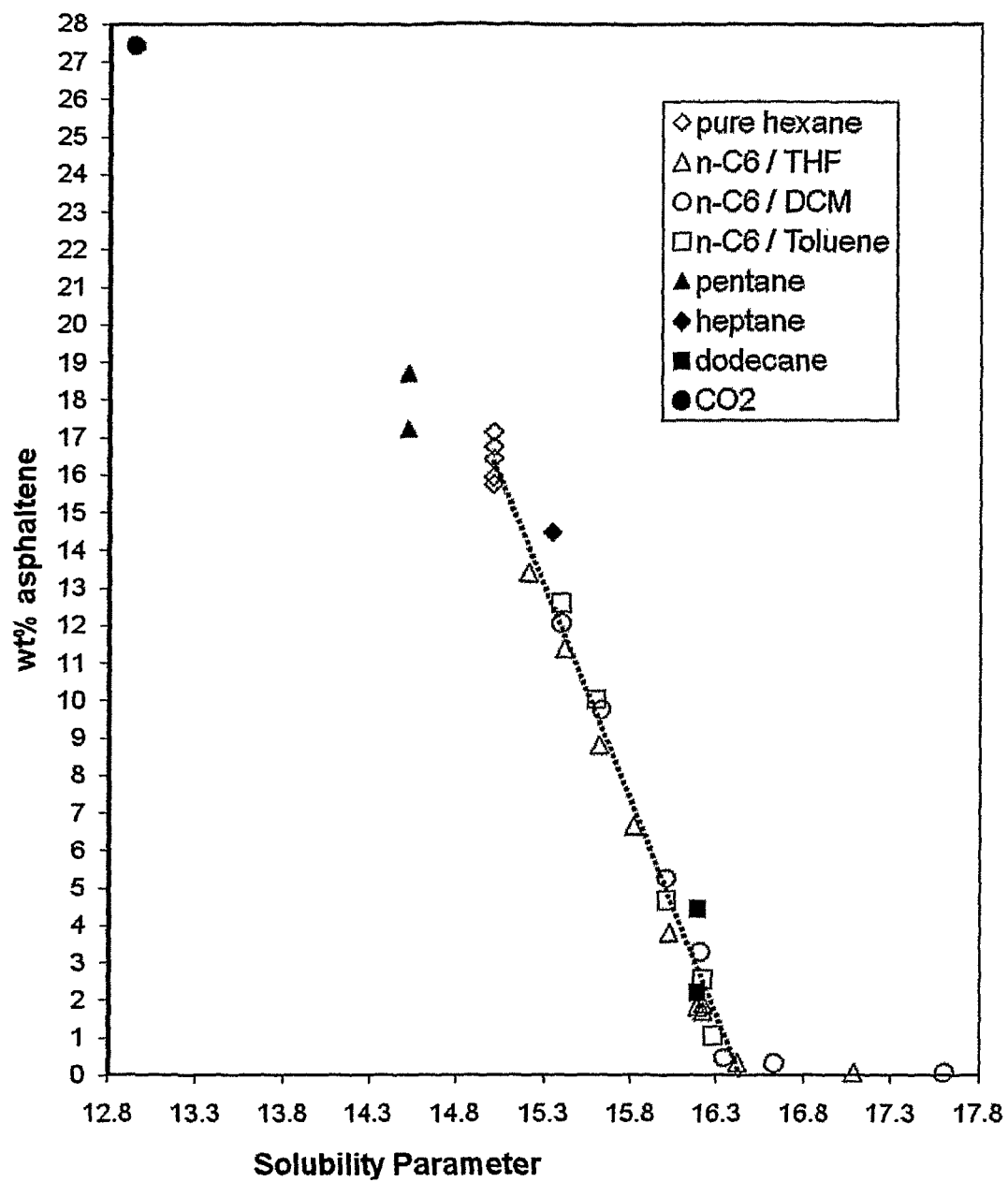
FIG. 3 is a third graph showing the same results and some additional data points, but with the amount of asphaltic precipitate plotted against Hildebrand solubility parameter of the oil-plus-diluent mixture.

This result has been included in FIG. 3 and can be seen to be generally consistent with the data obtained with the diluents consisting of materials which are liquid under ambient conditions. A curve to fit this result and also the data points with liquid diluents is given by the formula $$y=-1.693(\delta_{mix})^2+41.863\delta_{mix}-231.2 \quad (X)$$

where y is percent asphaltic precipitation and $\delta_{mix}$ is the solubility parameter of the oil-plus-diluent mixture.

Another series of experiments was carried out using a heavy crude oil from the same source as the oil used in the experiments above, so that it had very similar density and API gravity. This oil was initially dewatered by rotary evaporation at 60° C. under vacuum (15 mbar pressure) for two hours with brief interruptions every 15 minutes to vent the apparatus and then reapply vacuum. Five samples of varying size were dewatered in the same way and the percentage weight loss was observed to be accurately repeatable indicating that all water had been removed by evaporation.

1 gm sub-samples of this dewatered oil were equilibrated with approximately 40 ml of viscosity-reducing diluent for 48 hours at ambient temperature, then filtered to collect precipitated solids and the collected residue washed with an additional quantity of the same diluent, following the same procedure as in the experiments above.

The diluents were heptane, limonene and mixtures of the two, in some cases with a small quantity of toluene. The Hildebrand solubility parameter of each diluent mixture was calculated using the values for heptane, toluene and limonene mentioned above: heptane 15.25; limonene 16.4 and toluene 18.2. The Hildebrand solubility parameter for the overall mixture of diluents and oil was also calculated, taking the solubility parameter of the oil to be 18.6 MPa$^{1/2}$ as for the oil in the first series of experiments. The compositions of the mixtures, the calculated values of solubility parameter and the weights of residue on the filter paper are set out in the following table:

| Test | Volume oil (ml) | Volume toluene (ml) | Volume heptane (ml) | Volume limonene (ml) | Solubility Parameter $\delta_{diluent}$ | Solubility Parameter $\delta_{oil+diluent}$ | Residue (wt % of oil) |
|---|---|---|---|---|---|---|---|
| 1 | 1.03 | 2.28 | 40.2 | none | 15.41 | 15.48 | 14.9 |
| 2 | 1.04 | 3.41 | 40.3 | none | 15.48 | 15.55 | 12.2 |
| 3 | 1.07 | none | 20.6 | 22.5 | 15.85 | 15.92 | 6.7 |
| 4 | 1.07 | none | 5.9 | 35.6 | 16.24 | 16.30 | 0.4 |
| 5 | 1.21 | 1.96 | none | 39.9 | 16.48 | 16.54 | 0.03 |
| 6 | 1.06 | 3.48 | none | 39.9 | 16.54 | 16.59 | 0.18 |

The amounts of asphaltene precipitated, as a weight percentage of the oil, were plotted against the solubility parameter of the oil+diluent mixture. The resulting graph is shown as FIG. 4 and can be seen to be very similar to FIG. 3, although the value of $\delta_{onset-crit}$ for this oil is slightly lower at 16.31 MPa$^{1/2}$ Tests 5 and 6, in which the diluent was principally limonene, gave no precipitate of asphaltene. This observation was confirmed by visual inspection of the washed filter papers. Black asphaltene could be seen on the filter paper for mixture 4, even though the weight of precipitated asphaltene collected was small whereas the filter paper for test 6 was merely discoloured to pale brown (assumed to be inorganic material).

Figure 4:
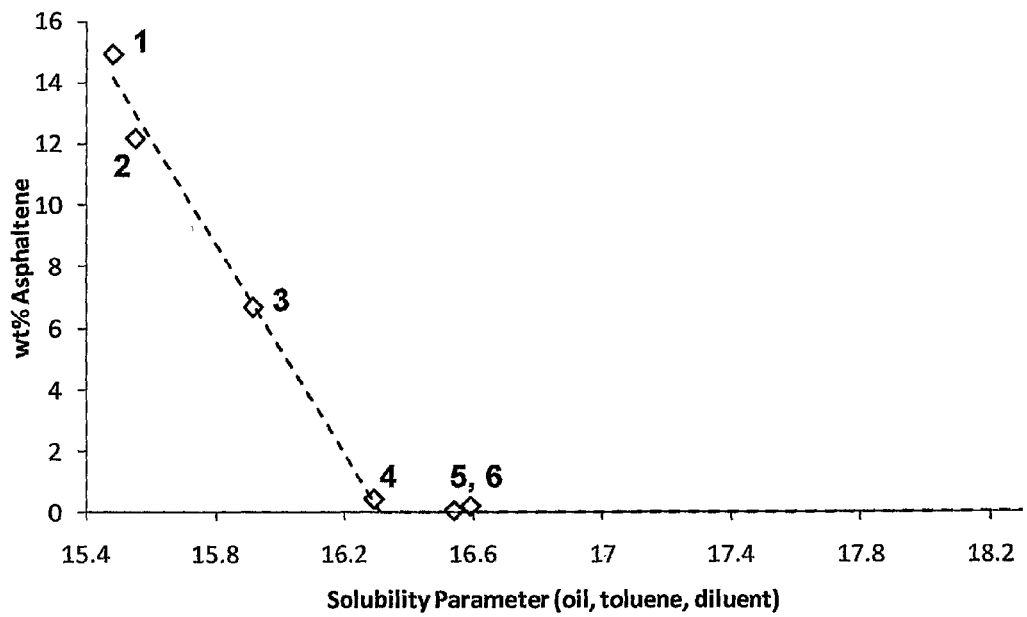
FIG. 4 is a graph showing results from a second series of experiments with the amount of asphaltic precipitate plotted against Hildebrand solubility parameter of the oil-plus-diluent mixture.
Figure 5:
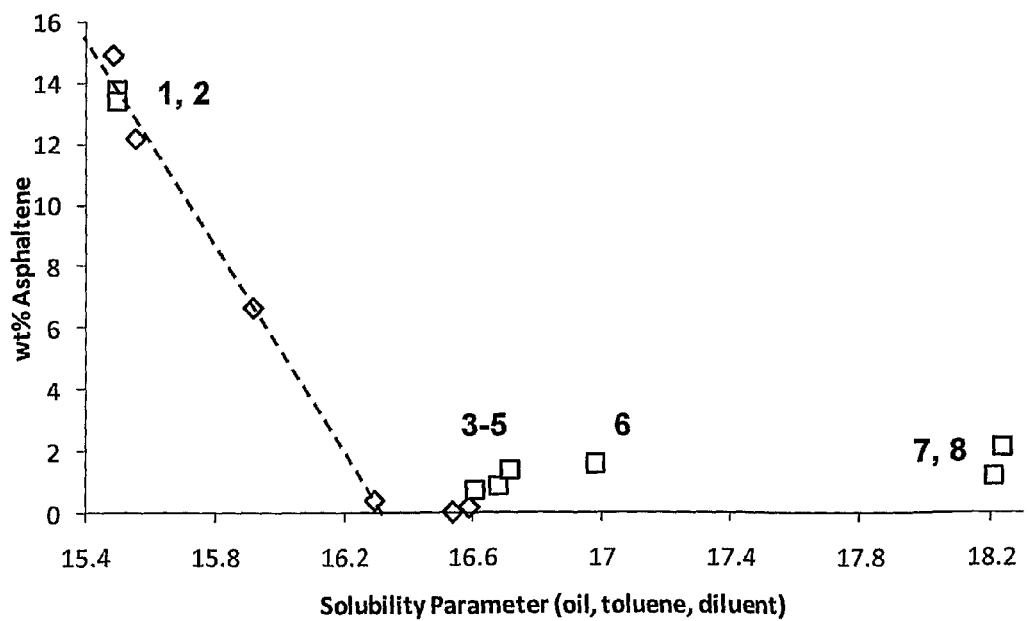
FIG. 5 is the graph of FIG. 4 including additional results obtained by a different experimental technique.

In a related series of experiments, mixtures of oil and diluent were allowed to equilibrate in a test cell equipped for filtration by application of pressure to drive the cell contents through a filter paper supported on a metal mesh at the base of the test cell. Each mixture was allowed to equilibrate for four hours at 43.5° C. under an applied nitrogen pressure of 100 psi (6.91 bar) and then filtered through a 0.45 micron polytetrafluoroethylene filter paper by venting the pressure below the filter paper. The mixtures and calculated values of solubility parameter are set out in the following table. FIG. 5 shows these results (represented as square points) superimposed on the graph of FIG. 4.

| Test | Volume oil (ml) | Volume toluene (ml) | Volume heptane (ml) | Volume limonene (ml) | Solubility Parameter $\delta_{diluent}$ | Solubility Parameter $\delta_{oil+diluent}$ | Residue (wt % of oil) |
|---|---|---|---|---|---|---|---|
| 1 | 1.00 | 2.55 | 40.4 | none | 15.43 | 15.50 | 13.8 |
| 2 | 1.08 | 2.51 | 40.6 | none | 15.42 | 15.50 | 13.4 |
| 3 | 1.03 | 3.91 | none | 38.9 | 16.56 | 16.61 | 0.76 |
| 4 | 1.01 | 2.47 | none | 20.3 | 16.60 | 16.68 | 0.91 |
| 5 | 1.02 | 2.69 | none | 18.7 | 16.63 | 16.72 | 1.40 |
| 6 | 1.24 | 2.47 | none | 8.7 | 16.80 | 16.98 | 1.62 |
| 7 | 1.06 | 36.19 | none | none | 18.20 | 18.21 | 1.23 |
| 8 | 1.05 | 10.03 | none | none | 18.20 | 18.24 | 2.15 |

It can be seen from this graph that limonene, with a solubility parameter of 16.4 $MPa^{1/2}$ is as effective an asphaltene solvent as toluene even though toluene has a higher solubility parameter of 18.2 $MPa^{1/2}$.

(With both limonene and toluene, it was observed that small amounts of residue were collected on the filter paper and that the amounts increased slightly as the volume of diluent was reduced. This was because the collected residue was not washed, so that some viscous oil was retained on the filter paper).

A viscosity reducing diluent mixture may be delivered to a reservoir formation in various ways. One possibility is schematically illustrated in FIG. 4. An injection well 17 has a casing 15. A pipeline 20 with a smaller pipeline 21 within it is lowered within the casing 15. These may be provided by coiled tubing. An asphaltene precipitant, which may be carbon dioxide, is pumped from a supply 11 down the annulus between the pipeline 20 and the enclosed smaller pipeline 21. An asphaltene solvent from a supply 13 is pumped down the smaller pipeline 21. They mix at the foot of the injection well 17 from which they exit at 19 into a reservoir formation while at 29 a mixture of oil and diluent flows into a production well 27 which is at some distance from the injection well 17. In this example both wells are vertical, but the invention may be applied to wells at other orientations.

EXAMPLES OF PREDICTION AND DESIGN

The purpose of these examples is to show the making of predictions. A number of hypothetical oils and properties of the kind that can be found by experiments as above are used in Examples 3 onwards as starting points for predictions.

Example 1

It is assumed, in order to illustrate the possibility of making a forecast of precipitation, that the heavy crude oil whose properties were found by the experiments above is to be extracted by injecting nonane into the reservoir and that the reservoir temperature is 25° C. Nonane has a solubility parameter of 15.4 $MPa^{1/2}$ at 25° C. If it is assumed that the oil becomes diluted with nonane in proportions of 30 volumes nonane to 1 volume oil, the Hildebrand solubility parameter for the added liquid will be given by $$\delta_{mix} = \phi_{oil}\delta_{oil} + \phi_{nonane}\delta_{nonane}$$

where $\phi_{oil}$ is 1/31 and $\phi_{nonane}$ is 30/31. The solubility parameter for such a mixture of oil and nonane calculates as $\delta_{mix}$=15.5 $MPa^{1/2}$ and from FIG. 3 the percentage asphaltene precipitated is forecast to be 10.5% by weight.

Example 2

This example also refers to the same heavy oil as in Example 1. As mentioned earlier, on FIG. 3, a curve taking in the data point for supercritical carbon dioxide at 2200 psi and 40 C is given by the formula (X)

$$y = -1.693(\delta mix)^2 + 41.863\delta_{mix} - 231.2 \quad (X)$$

where y is percent asphaltic precipitation and $\delta_{mix}$ is the solubility parameter of the oil-plus-diluent mixture. Using this formula, it is possible to predict the percentage asphaltic separation from the heavy crude oil when the viscosity reducing diluent is supercritical carbon dioxide at 4500 psi pressure and 40° C.

Under these conditions the Hildebrand solubility parameter of supercritical carbon dioxide is 14.3 $MPa^{1/2}$ read off from curves published by Allada which have been mentioned earlier. Assuming that dilution is 40:1, the solubility parameter of the mixture is given by:

$$\delta_{mix} = 1/40 \times \delta_{oil} + 40/41 \times \delta_{CO2} = 14.4 \; MPa^{1/2}$$

Substituting this in the formula above, asphaltene precipitation is predicted to be 20.5%.

Example 3

It is assumed that a hypothetical medium crude oil has been found by experimentation to have the following values at its reservoir temperature of 30° C.:
$\delta_{onset-crit}$ 16.2 $MPa^{1/2}$
$\delta_{oil}$ 18.0 $MPa^{1/2}$
Asphaltene precipitated by hexane: 6 wt %.

A graph of asphaltene precipitation against solubility parameter of the overall mixture takes the form of a straight line given by the equation $$y = -3.75\delta_{mix} + 60.75 \quad (XI)$$

where $\delta_{mix}$=the solubility parameter of the oil-plus-diluent mixture and y is the amount of asphaltic precipitate, as a percentage of the crude oil, when equilibrium is reached.

It is decided to make a viscosity reducing diluent mixture from two constituents which are both refinery distillates. These are
(i) a mixture of alkanes having solubility parameter of 14.5 at 30° C.
(ii) a mixture of aromatics, having solubility parameter of 17.8 at 30° C.

The solubility parameter for mixtures containing 10%, 20%, 30% and 40% aromatics by volume is calculated using the formula $$\delta_{diluent} = \phi_{alkanes}\delta_{alkanes} + \phi_{aromatics}\delta_{aromatics} = \phi_{alkanes} \times 14.5 + \phi_{aromatics} \times 17.8$$

It is assumed, for the purposes of prediction, that the diluent to oil ratio in the reservoir will be 40 to 1. Then the solubility parameter of diluted oil is calculated using the formula $$\delta_{mix} = \phi_{oil}\delta_{oil} + \phi_{diluent}\delta_{diluent} = 1/41 \times \delta_{oil} + 40/41 \times \delta_{diluent}$$

Similar calculations are carried out for diluent to oil ratios of 30 to 1 and 20 to 1. The calculated values of $\delta_{mix}$ are substituted in the equation (XI) above to give the forecast amount of precipitation as a percentage by weight of the crude oil. The calculated values of $\delta_{diluent}$, $\Theta_{mix}$ and the forecast percentages of precipitated asphaltene are set out in the following table:

| percent aromatics in diluent | $\delta_{diluent}$ (MPa$^{1/2}$) | $\delta_{mix}$ at 40:1 dilution (MPa$^{1/2}$) | percent precipitate | $\delta_{mix}$ at 30:1 dilution (MPa$^{1/2}$) | percent precipitate | $\delta_{mix}$ at 20:1 dilution (MPa$^{1/2}$) | percent precipitate |
|---|---|---|---|---|---|---|---|
| 10 | 14.83 | 14.91 | 4.85 | 14.93 | 4.75 | 14.98 | 4.57 |
| 20 | 15.16 | 15.23 | 3.64 | 15.25 | 3.56 | 15.30 | 3.39 |
| 30 | 15.49 | 15.55 | 2.43 | 15.57 | 2.36 | 15.61 | 2.21 |
| 40 | 15.82 | 15.87 | 1.23 | 15.89 | 1.16 | 15.92 | 1.04 |

Example 4

It is assumed that a hypothetical light crude oil occurs in a reservoir with reservoir temperature of 40° C. and reservoir pressure of 2200 psi (150 bar) under which conditions the oil has the following properties:

$\delta_{onset\text{-}crit}$ 16.0 MPa$^{1/2}$ $\delta_{oil}$ 17.0 MPa$^{1/2}$

Asphaltene precipitated by hexane: 2 wt %.

A graph of asphaltene precipitation against solubility parameter of the mixture takes the form of a straight line given by the equation $$y = -1.25\delta_{mix} + 20 \quad (XII)$$

It is intended to use carbon dioxide as viscosity reducing diluent. This will be supercritical at the reservoir temperature of 40° C. The Hildebrand solubility parameter of carbon dioxide at 40° C. and 150 bar (2200 psi) was taken as 12.5 Mpa$^{1/2}$ read off from the curves published by Allada. The possibility of including limonene as an asphaltene solvent is also contemplated. It is expected this will lead to a considerable increase in oil extraction efficiency and so the dilution of the oil may be modest, perhaps around 10 to 1. The Hildebrand solubility parameter of limonene at 40° C. is 16.3 MPa$^{1\over 2}$ and the solubility parameter for various percentages of limonene in the carbon dioxide is calculated as in the previous example. The formula is written, for convenience, as;

$$\delta_{diluent} = \phi_{CO2}\delta_{CO2} + \phi_{limonene}\delta_{limonene}$$

The solubility parameter of diluted oil is calculated as in the previous example, for three dilution ratios and then the resulting values of $\delta_{mix}$ are substituted in the equation (XII) above to give the forecast amount of precipitation as a percentage by weight of the crude oil. The calculated values of $\delta_{diluent}$, $\delta_{mix}$ and the forecast percentages of precipitated asphaltene are set out in the following table:

Example 5

It is assumed that a hypothetical medium crude oil occurs in a reservoir with reservoir temperature of 35° C. and reservoir pressure of 2200 psi (150 bar) under which conditions the oil has the following properties:

$\delta_{onset\text{-}crit}$ 16.2 MPa$^{1/2}$ $\delta_{oil}$ 17.4 MPa$^{1/2}$

Asphaltene precipitated by hexane: 5 wt %.

A graph of asphaltene precipitation against solubility parameter of the overall mixture takes the form of a straight line given by the equation $$y = -3.13\delta_{mix} + 50.63 \quad (XIII)$$

It is intended to use carbon dioxide as viscosity reducing diluent. This will be supercritical at the reservoir temperature of 35° C. At the reservoir temperature and pressure it has a solubility parameter of 13.0 MPa$^{1/2}$ read off from the curves published by Allada. A mixture of limonene (solubility parameter 16.3 MPa$^{1/2}$) and methyl ester of soybean oil (solubility parameter 17.9 MPa$^{1/2}$) in 6:4 ratio is chosen as asphaltene solvent. The solubility parameter of this mixture is calculated using the formula:

$$\delta = \phi_{limonene}\delta_{limonene} + \phi_{m\text{-}oleate}\delta_{m\text{-}oleate} = 0.6 \times 16.3 + 0.4 \times 17.9 = 16.94$$

Calculation as in preceding examples gives the forecast in the following table:

| percent limonene in diluent | $\delta_{diluent}$ (MPa$^{1/2}$) | $\delta_{mix}$ at 40:1 dilution (MPa$^{1/2}$) | wt % precipitate | $\delta_{mix}$ at 25:1 dilution (MPa$^{1/2}$) | wt % precipitate | $\delta_{mix}$ at 10:1 dilution (MPa$^{1/2}$) | wt % precipitate |
|---|---|---|---|---|---|---|---|
| 0 | 12.5 | 12.61 | 4.24 | 12.67 | 4.16 | 12.91 | 3.86 |
| 5 | 12.69 | 12.80 | 4.01 | 12.86 | 3.93 | 13.08 | 3.65 |
| 10 | 12.88 | 12.98 | 3.77 | 13.04 | 3.70 | 13.25 | 3.43 |
| 20 | 13.26 | 13.35 | 3.31 | 13.40 | 3.25 | 13.60 | 3.00 |
| 30 | 13.64 | 13.72 | 2.85 | 13.77 | 2.79 | 13.95 | 2.57 |
| 40 | 14.02 | 14.09 | 2.38 | 14.13 | 2.33 | 14.29 | 2.14 |

| percent solvent in diluent | $\delta_{diluent}$ (MPa$^{1/2}$) | $\delta_{mix}$ at 40:1 dilution (MPa$^{1/2}$) | wt % precipitate | $\delta_{mix}$ at 25:1 dilution (MPa$^{1/2}$) | wt % precipitate | $\delta_{mix}$ at 10:1 dilution (MPa$^{1/2}$) | wt % precipitate |
|---|---|---|---|---|---|---|---|
| 0 | 13 | 13.11 | 9.66 | 13.17 | 9.47 | 13.40 | 8.75 |
| 5 | 13.20 | 13.30 | 9.06 | 13.36 | 8.88 | 13.58 | 8.19 |
| 10 | 13.39 | 13.49 | 8.46 | 13.55 | 8.29 | 13.76 | 7.63 |
| 20 | 13.79 | 13.88 | 7.26 | 13.93 | 7.10 | 14.12 | 6.51 |

Determination of a relationship between precipitation by a diluent and a solubility parameter of diluted oil requires experimental work, such as set forth above. Utilization of that relationship to forecast precipitation or predetermine proportions of constituents of a viscosity reducing diluent mixture may be a matter of reading from a graph or pen-and-paper arithmetical calculation. However, the step of utilizing the relationship may, as mentioned earlier, be carried out with a programmed computer and may be included in a computer simulation of changes in a reservoir formation when injecting a viscosity reducing diluent into that formation. This is diagrammatically shown in FIG. 7. The computer 30 would be programmed to receive input data including the relationship, or laboratory data on asphaltene precipitation from which the relationship is then calculated and then utilize the relationship in a simulation of changes following injection of a diluent mixture.

The invention claimed is:

1. A method of forecasting asphaltic precipitation when injecting a viscosity reducing diluent into a reservoir formation to assist oil recovery therefrom, the method comprising:
   determining a relationship between the magnitude of asphaltic precipitation and a solubility parameter for the oil when diluted;
   utilizing the relationship to forecast the magnitude of asphaltic precipitation within the formation consequent upon injecting a predetermined viscosity reducing diluent into the formation; and
   injecting a viscosity reducing diluent into the reservoir formation to assist oil recovery from the reservoir formation.

2. A method according to claim 1 wherein the viscosity reducing diluent comprises carbon dioxide which is in supercritical form within the reservoir formation.

3. A method according to claim 1 wherein determining a relationship comprises determining a solubility parameter corresponding to the onset of asphaltene precipitation.

4. A method according to claim 1 wherein determining a relationship comprises performing a series of experiments each comprising mixing a measured amount of oil from the reservoir with a measured amount of a liquid which is at least partially miscible with the oil, where the experiments in the series differ from one another in the proportions of oil and liquid and/or solubility parameter of the liquid, obtaining as a result of each experiment an observation whether asphaltene separation occurs, and a measurement of the amount of separated asphaltene, and utilizing the experimental results together with the amounts of the oil and liquids and the solubility parameters of the liquid(s) to determine the relationship between the magnitude of asphaltic precipitation and a solubility parameter for the oil when diluted and the solubility parameter of diluted oil at the onset of asphaltene precipitation.

5. A method according to claim 1 wherein utilization of a relationship between asphaltic precipitation and a solubility parameter for the diluted oil is carried out by a computer programmed to simulate changes in a reservoir formation when a viscosity reducing diluent is injected into the formation.

6. A method according to claim 1 comprising utilizing the said relationship to forecast the magnitude of asphaltic precipitation within the formation when injecting each of a plurality of predetermined viscosity reducing diluents into the formation.

7. A method according to claim 1 comprising utilizing the said relationship to predetermine proportions of constituents in a viscosity reducing diluent mixture forecast to avoid asphaltic precipitation within the formation when injected into the formation.

8. A method according to claim 1 wherein the viscosity reducing diluent mixture contains carbon dioxide and a of at least one added substance which takes a liquid form when it is at 20 deg.C and one bar pressure, the proportion by weight of carbon dioxide being larger than the proportion by weight of the at least one added substance and wherein, when the viscosity reducing diluent mixture is within the reservoir formation, the carbon dioxide is in supercriticial form with the added substance(s) dissolved therein.

9. A method according to claim 2 wherein the viscosity reducing diluent also comprises a liquid or liquid mixture which is more polar that the carbon dioxide, the proportion by volume of carbon dioxide being larger than the proportion by volume of the liquid or liquid mixture.

10. A method according to claim 3 which comprises performing a series of experiments each comprising mixing a measured amount of oil from the reservoir with a measured amount of a liquid which is partially miscible with the oil, where the experiments in the series differ from one another in the solubility parameter of the liquid and a result of each experiment is a measurement of the amount of separated asphaltene or an observation that no precipitation has occurred and also performing a series of experiments each comprising mixing a measured amount of oil from the reservoir with a measured amount of a liquid which is partially miscible with the oil, where the experiments in the series differ from one another in the proportions of oil and liquid and a result of each experiment is an observation whether asphaltene separation occurs, and utilizing the results from both series of experiments together with the amounts of the oil and liquids and the solubility parameters of the liquids to determine the solubility parameter of diluted oil at the onset of asphaltene precipitation and also a relationship between solubility parameter and the amount of asphaltene precipitated.

11. A method according to claim 9 wherein the carbon dioxide and the more polar liquid or liquid mixture are conveyed separately down a wellbore towards the reservoir formation and are mixed together after the carbon dioxide has reached a supercritical state.

12. A method according to claim 9 wherein the liquid or liquid mixture comprises at least one aliphatic compound which includes at least one of the following: a cycloaliphatic ring, an olefinic unsaturation, a ester, an ether group.

13. A method of forecasting asphaltic precipitation when injecting a viscosity reducing diluent into a reservoir formation, the method comprising:
- performing a series of experiments each comprising mixing a measured amount of oil from the reservoir with a measured amount of a liquid which is at least partially miscible with the oil, where the experiments in the series differ from one another in the proportions of oil and liquid and/or solubility parameter of the liquid, obtaining as a result of each experiment an observation whether asphaltene separation occurs, and a measurement of the amount of any separated asphaltene;
- determining a relationship between the magnitude of asphaltic precipitation and a solubility parameter for diluted oil from the experimental results;
- utilizing the relationship to forecast the magnitude of asphaltic precipitation within the formation consequent upon injecting each of a plurality of candidate predetermined viscosity reducing diluents into the formation, each candidate diluent comprising carbon dioxide and at least one candidate diluent also comprising at least one added substance which takes a liquid form when it is at 20 deg.C and one bar pressure, the proportion by weight of carbon dioxide being larger than the proportion by weight of the at least one added substance; and
- injecting a viscosity reducing diluent into a reservoir formation to assist oil recovery from the reservoir formation, where the injected diluent comprises carbon dioxide and the temperature and pressure within the reservoir formation are such that the carbon dioxide is in supercritical form within the reservoir formation.

* * * * *